US007840211B2

(12) United States Patent
Plumb et al.

(10) Patent No.: US 7,840,211 B2
(45) Date of Patent: Nov. 23, 2010

(54) SYSTEM AND METHOD OF MANAGING COMMUNICATIONS POLICY SETTINGS IN A WIRELESS NETWORK

(75) Inventors: Marc Plumb, Waterloo (CA); Ian Michael Patterson, Petersburg (CA); Seán Arthur Daniel Carlos Goggin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 507 days.

(21) Appl. No.: 11/260,179

(22) Filed: Oct. 28, 2005

(65) Prior Publication Data

US 2007/0099600 A1    May 3, 2007

(51) Int. Cl.
*H04M 3/42* (2006.01)
(52) U.S. Cl. ............... 455/415; 455/404.1; 455/417; 455/418; 455/419; 455/567; 379/210.02; 379/210.03; 379/211.01
(58) Field of Classification Search ............. 455/404.1, 455/415, 417, 418, 419, 567; 379/210.02, 379/210.03, 211.01
See application file for complete search history.

(56) References Cited

U.S. PATENT DOCUMENTS

| 5,754,956 | A | 5/1998 | Abreu et al. |
| 5,815,808 | A | 9/1998 | Valentine et al. |
| 5,884,193 | A | 3/1999 | Kaplan |
| 6,058,301 | A | 5/2000 | Daniels |
| 6,081,731 | A | 6/2000 | Boltz et al. |
| 6,289,084 | B1 * | 9/2001 | Bushnell ................ 379/67.1 |
| 6,654,452 | B1 * | 11/2003 | Murray et al. ............ 379/197 |

(Continued)

FOREIGN PATENT DOCUMENTS

DE    19805261 C2    8/1999

(Continued)

OTHER PUBLICATIONS

Glossary of Bell Canada products and Services: A to C, dated 1998, at: http'llwww.hackcanada.comlcanadianlphreakinglbcpsl.html (7 pp.)l.*

(Continued)

*Primary Examiner*—Stephen M D'Agosta
(74) *Attorney, Agent, or Firm*—Perry + Currier Inc.

(57)    ABSTRACT

The present invention provides a system and method of modifying policy settings in a network having a plurality of subscriber devices. An embodiment includes a plurality of base stations, each capable of wirelessly transmitting across a geographic region and a server. A cell-phone, capable of roaming between regions, is operable to establish a wireless link with the base stations and through the base stations, with the server. The network contains a communication policy determining from which other communication devices a subscriber device can receive voice calls. The communication policy is updated, by the server, based on requests from the subscriber devices. Once a request is received from a subscriber device, the determination whether to update the communication policy can be based on a record of rejections respective to the caller requested to be blocked. Alternatively, the communication policy can be updated according to a trust policy maintained on the server respective to the subscriber device making the request; the trust policy represents the procedure to follow when a request is received from that subscriber device.

13 Claims, 23 Drawing Sheets

U.S. PATENT DOCUMENTS

| | | | |
|---|---|---|---|
| 6,697,840 | B1 | 2/2004 | Godefroid et al. |
| 6,701,160 | B1 | 3/2004 | Pinder et al. |
| 6,788,773 | B1 | 9/2004 | Fotta |
| 6,915,123 | B1 | 7/2005 | Daudelin et al. |
| 6,941,471 | B2 | 9/2005 | Lin |
| 7,099,444 | B1 | 8/2006 | Russell |
| 2001/0051534 | A1* | 12/2001 | Amin .................. 455/565 |
| 2002/0107032 | A1 | 8/2002 | Agness et al. |
| 2002/0165012 | A1 | 11/2002 | Kirbas et al. |
| 2003/0087629 | A1* | 5/2003 | Juitt et al. ............. 455/411 |
| 2003/0236890 | A1 | 12/2003 | Hurwitz et al. |
| 2004/0147278 | A1 | 7/2004 | Miramontes |
| 2004/0198319 | A1 | 10/2004 | Whelan et al. |
| 2004/0213396 | A1 | 10/2004 | Macnamara et al. |
| 2004/0264656 | A1 | 12/2004 | Walsh et al. |
| 2005/0129206 | A1 | 6/2005 | Martin |
| 2006/0218283 | A1 | 9/2006 | Jones et al. |
| 2006/0286965 | A1 | 12/2006 | Lauridsen et al. |

FOREIGN PATENT DOCUMENTS

| | | | |
|---|---|---|---|
| EP | 1102191 | A | 5/2001 |
| EP | 1505807 | A | 2/2005 |
| WO | WO 98/42114 | A | 9/1998 |
| WO | 9846035 | | 10/1998 |
| WO | 9916268 | | 4/1999 |
| WO | 9933188 | | 7/1999 |
| WO | 2004054215 | A1 | 6/2004 |
| WO | 2005060223 | A1 | 6/2005 |

OTHER PUBLICATIONS

Glossary of Bell Canada Products and Services: A to C, accessed on Feb. 7, 2006 at: http://www.hackcanada.com/canadian/phreaking/bcps1.html (7 pp.), NOTE: The pub date on this document is 1998.

Srivastava K et al., Preventing Spam For SIP-based Instant Messages and Sessions, Oct. 28, 2004 pp. 1-16.

Segal, Richard, et al. "SpamGuru: An Enterprise Anti-Spam Filtering System" Proceedings of the First Conference on Email and Anti-Spam, Jun. 2004, XP007902458, Chapter 2.

Hird, Shane, "Technical Solutions for Controlling Spam" Proceedings of Aug. 2002, Sep. 4, 2002-Sep. 6, 2002, XP007902457, Chapter "Collaborative Filtering".

Capitani Di Vimercati De S, et al. "Access 1-17 Control: Principles and Solutions" Software Practice & Experience, wiley & Sons, Bognor Regis, GB, vol. 33, No. 5, Apr. 25, 2003, pp. 397-421, XP001144880 ISSN: 0038-0644.

Boucadair C Jacquenet M Achemlal Y Adam France Telecom M: "Requirement for Efficient and Automated Configuration Management; draft-boucadair-netconf-req-00.txt;"IETF Standard-Working-Draft, Internet Engineering Task Force, IETF, CH, Jul. 2004, XP 015011052, ISSN: 0000-0004.

ONO NTT Corporation H Schulzrinne Columbia University K: "Trust Path Discovery; draft-ono-trust-path-discovery-01.txt" IETF Standard-Working-Draft, Internet Engineering Task Force, IETF, CH, No. 1, Oct. 22, 2005, XP015042952 ISSN: 0000-0004.

Technical Specification ETSI TS 123 122 V3.5.0 (Dec. 2000) Universal Mobile Telecommunications System (UMTS) © European Telecommunications Standards Institue 2000.

Technical Specification ETSI TS 100 927 V7.5.0 (Dec. 2000) Digital cellular telecommunications system (Phase 2+) © European Telecommunications Standards Institute 2000.

Maryniok & Eichstadt, Law firm, Opposition dated May 3, 2008, European Patent Office.

Canadian Office Action dated Dec. 4, 2009.

* cited by examiner

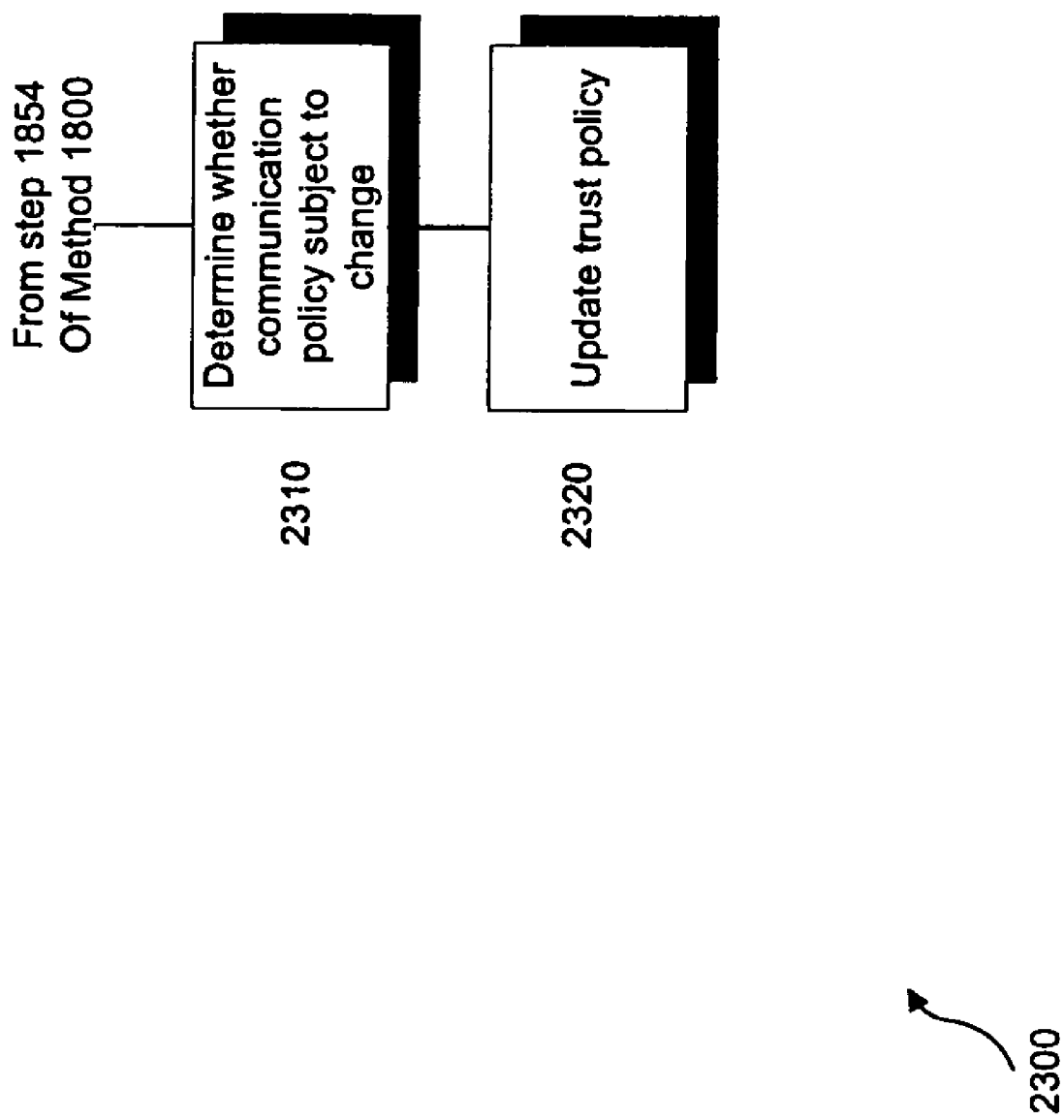

SYSTEM AND METHOD OF MANAGING COMMUNICATIONS POLICY SETTINGS IN A WIRELESS NETWORK

FIELD OF THE INVENTION

The present invention relates generally to wireless telecommunication and more particularly to a system and method of managing communications policy settings in a wireless network.

BACKGROUND OF THE INVENTION

Mobile telephonic devices ("cell-phones") capable of wireless communications are increasingly commonplace. Cell-phones typically integrate a variety of functionality into a single device, but the ability to carry out voice telecommunications remains central to the devices' purpose. Nokia of Keilalahdentie 2-4, Finland and Motorola Inc. of Schaumburg, Ill., U.S.A. are two examples of manufacturers of such cell-phones, and each offer a variety of products in this category.

A typical cell-phone contains a communications interface for establishing wireless communications with telephony networks ("wireless networks"). In addition, a typical cell-phone also has a microcomputer which controls most of the functionality of the cell-phone and aids in processing of information that the cell-phone is presented with.

As part of its functionality, a cell-phone is called upon to establish communications with the wireless networks by accessing different network base stations as the user of the cell-phone roams through different geographic regions served by these base stations. Accordingly, a cell-phone is able to establish communications with other communications devices through the wireless network, allowing the cell-phone to place calls to and to receive calls from these other devices.

As the volume of communications in wireless networks grows, so does the volume of unwanted and unsolicited communications. These communications usually originate from mass marketing sources, but can be from other entities as well. Unwanted calls, in addition to being inconvenient, can be costly as well. For example, long distance marketing calls, which due to the cost structure of Voice over IP have now become more feasible, are costly since, typically, cell-phone owners pay long distance charges for long distance calls received as well as placed.

There has been at least one attempt to devise a scheme for blocking unwanted calls. Specifically, an internet marketing brochure (http://www.hackcanada.com/canadian/phreaking/bcps1.html) discloses a call blocking service allowing the called party to divert up to twelve telephone numbers of their choice to a special recording that tells callers that the party they have reached has chosen not to take their call at this time. Numbers on the list can be altered by the subscriber at any time. This attempt, however, has several limitations. First of all, each subscriber's blocking list must be manually updated by each subscriber individually. Moreover, only a small number of calling numbers can be blocked. Finally, the call is diverted to a voice mail, which verifies the existence of that phone number to the caller. Bypassing this scheme, therefore, is relatively straightforward: if the initial attempt at placing an unwanted call is frustrated, the unwanted caller simply has to repeat the call using a new originating number. Given the limited number of phone numbers that can be blocked, and the manual nature of updating these by each subscriber, after several attempts, the caller is likely to reach most of the subscribers using this service. Moreover, according to this scheme, the caller's initial efforts are not altogether fruitless since even the diverted calls serve to verify the existence of a subscriber's phone number because of the voice mail.

SUMMARY OF THE INVENTION

It is an object of the present invention to provide a novel system and method of managing communications policy settings in a wireless network that obviates or mitigates at least one of the above-identified disadvantages of the prior art.

According to an aspect of the invention, a method is provided for processing communications in a voice telephony network having a plurality of subscriber devices and a server; the method comprising the steps of:

maintaining, at the server, a central communication policy including at least one identifier representing whether reception of a voice call having the at least one identifier is permissible at the subscriber devices in the network;

maintaining, at each subscriber device, a local communication policy; the local communication policy corresponding to the central communication policy;

receiving a voice call at one of the subscriber devices; the voice call having an originator identifier;

receiving a user-input at the subscriber device representing a marker of the originator identifier;

accessing the local common policy at the subscriber device;

updating the local common policy with the originator identifier associated with the marker, such that reception of a voice call having the originator identifier is impermissible at the subscriber device; and updating the central common policy with the originator identifier associated with the marker, such that reception of a voice call having the originator identifier is impermissible at the subscriber devices.

The updating of the central common policy can comprises the step of:

propagating said central common policy to said plurality of subscriber devices such that said local communication policy at each said plurality of subscriber devices is synchronized with said central common policy.

This propagating step can be performed after the step of updating the central common policy. Alternatively, this propagating step can be performed once over a given time period. The propagating step can also be performed after the steps of the above described method are performed a predetermined number of times.

The user-input can be received prior to the voice call being answered. The user-input can also be received after the voice call is answered. The originator identifier can be a Caller-ID string. The identifier in the central communication policy can include a Caller-ID string.

Another aspect of the invention provides a method of managing a communication policy in a voice telephony network having a plurality of subscriber devices. The method comprising the steps of:

maintaining a communication policy including at least one identifier representing whether the reception of a voice call having the identifier is permissible at the subscriber devices in the network;

receiving a notice of a rejection of the voice call by one of the subscriber devices; the voice call having an originating identifier;

updating a record of rejections respective to the originating identifier based on the notice; the record of rejections including the subscriber device and the originating identifier;

updating the communication policy if the record of rejections match a predefined criteria.

The record of rejections can represent a number of times calls have been rejected from the identifier. The record of rejections can also represent a number of different subscriber devices that have rejected a call from the identifier. The criteria can be above a predetermined threshold.

After the step of receiving, the method can further comprise the step of:

receiving a second notice of rejection respective to said originating identifier, after a passage of time from said receiving of said record of rejection.

In this case, the criteria can be an extent of time. The updating of the communication policy can be performed such that the originating identifier is removed from the communication policy if the passage of time is greater than the extent of time.

BRIEF DESCRIPTION OF THE DRAWINGS

The invention will now be described by way of example only, and with reference to the accompanying drawings, in which:

FIG. 23 is a flowchart depicting a method of updating information in accordance with an embodiment of the invention.

DETAILED DESCRIPTION OF THE INVENTION

Figure 1:
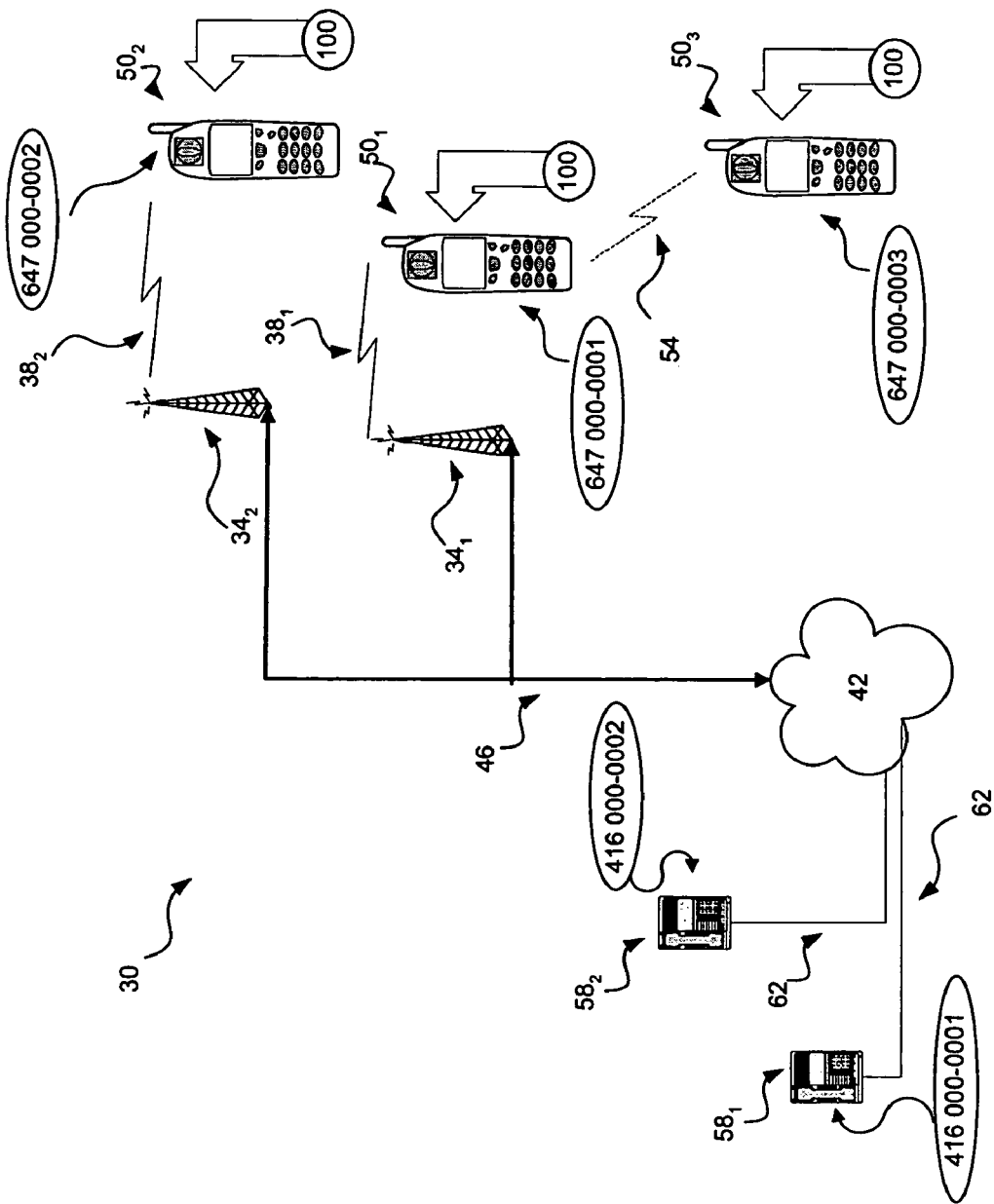
FIG. 1 is a block diagram of a system for managing a communication policy in accordance with an embodiment of the invention.

Referring now to FIG. 1, a wireless communication system in accordance with a first embodiment of the invention is indicated generally at 30. System 30 comprises a plurality of base stations 34 operable to wirelessly transmit across a variety of geographic ranges. Base stations 34 communicate wirelessly over a plurality of links 38. In a present embodiment, links 38 are based on a known voice-based wireless telecommunication such as Global System for Mobile Communications ("GSM") or Advanced Mobile Phone System ("AMPS").

In system 30, base stations 34 are also connected to a network 42 through a connection 46. In this embodiment, network 42 is the public switched telephone network ("PSTN") but, in other embodiments, other types of networks can be employed. Moreover, in this embodiment connection 46 is a fibre-optic wire connection, but in other embodiments connection 46 can be other types of connections such as copper wires or a satellite connection.

System 30 also includes a plurality of subscriber devices In this embodiment, each subscriber device is a cell-phone 50 such as those manufactured by Nokia of Keilalahdentie 2-4, Finland and Motorola Inc. of Schaumburg, Ill., U.S.A. In other embodiments, subscriber devices could have the functionality of a cell phone and other enhanced functions such as those manufactured by Research In Motion Limited of Waterloo, Ontario, Canada, or by PalmOne, Inc. of Milpitas, Calif. USA. Cell-phones 50 are operable to connect to network 42 via a base station 34's link 38 each time cell-phone 50 is located within a range respective to that base station 34. For example, whenever cell-phone $50_1$ is located within the range of base station $34_1$, cell-phone $50_1$ can connect to network 42 by linking with base station $34_1$ through link $38_1$, and whenever cell-phone $50_2$ is located within the range of base station $34_2$, cell-phone $50_2$ can connect to network 42 by linking with station $34_2$ through link $38_2$. Cell-phones 50 can also communicate with each other directly, without the need for a base station, through a peer-to-peer link 54. In this embodiment, a peer-to-peer link consists of a peer-to-peer IEEE 801.11b/g connection employing voice over IP protocol, but in other embodiments other types of peer-to-peer connections such as infrared and cross-linked wired Ethernet connections could also be used. These and other types of peer-to-peer connections are within the scope of the invention.

System 30 also includes phones 58 connected to network 42 through connections 62. Phone 58 is operable to place and receive phone calls through network 42. In other embodiments, phones 58 could represent multiple phones being operated as a call center from which calls are being placed.

Each call originated by a device carries an originator identifier "(OID)", regardless of whether the call is placed through network 42, a base station 34, or through link 54 in a peer-to-peer mode. In this embodiment, an OID is the phone number assigned to each originator phone 58 or cell-phone 50. However, other types of identifiers such as the name under which a phone 58 is registered or a serial number assigned to a cell-phone by the manufacturer can also be used as OIDs, and such variations are within the scope of this invention.

Figure 2:
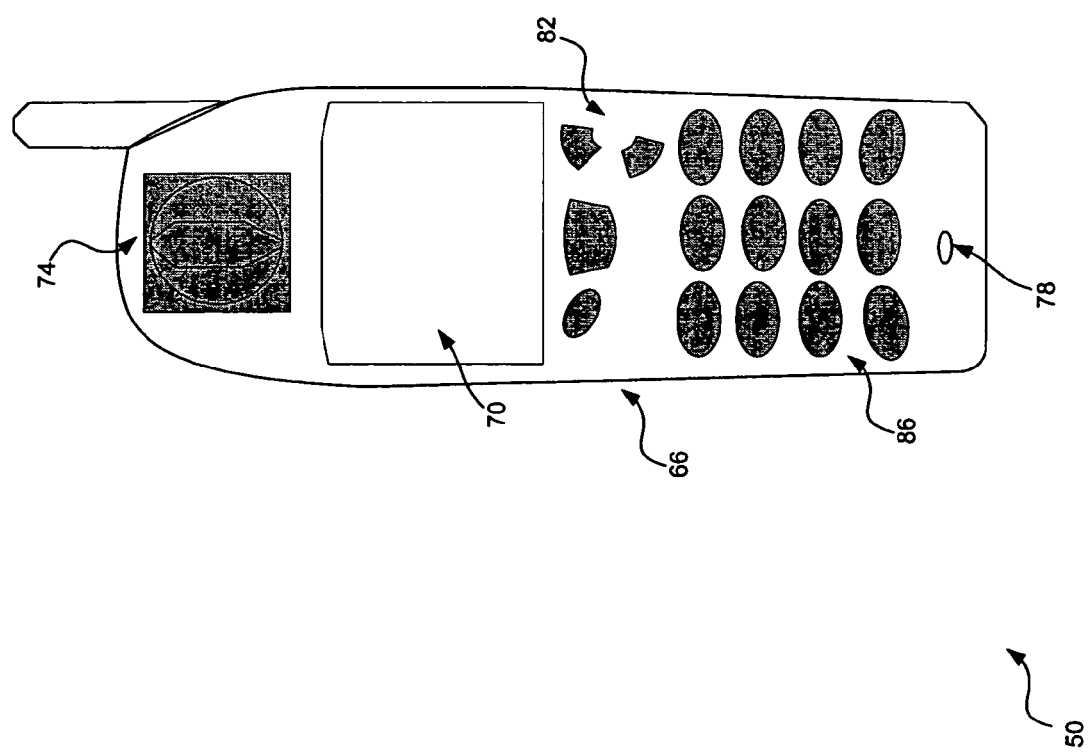
FIG. 2 is a block diagram of the mobile subscriber device of FIG. 1.

Referring now to FIG. 2, cell-phone 50 is shown in greater detail. Cell-phone 50 is based on a computing environment with wireless voice telephony capabilities. (However, it is to be understood that cell-phone 50 can be based on the construction and functionality of any mobile electronic device that can be connected to a wireless network as well. Such devices include personal digital assistants or laptops computers connected to wireless networks. In a present embodiment, a cell-phone 50 includes, a housing 66, which frames an LCD display 70, a speaker 74, a microphone 78, scroll buttons 82, and a keyboard 86. It will be understood that housing 66, can be made from any suitable material as will occur to those of skill in the art.)

Figure 3:
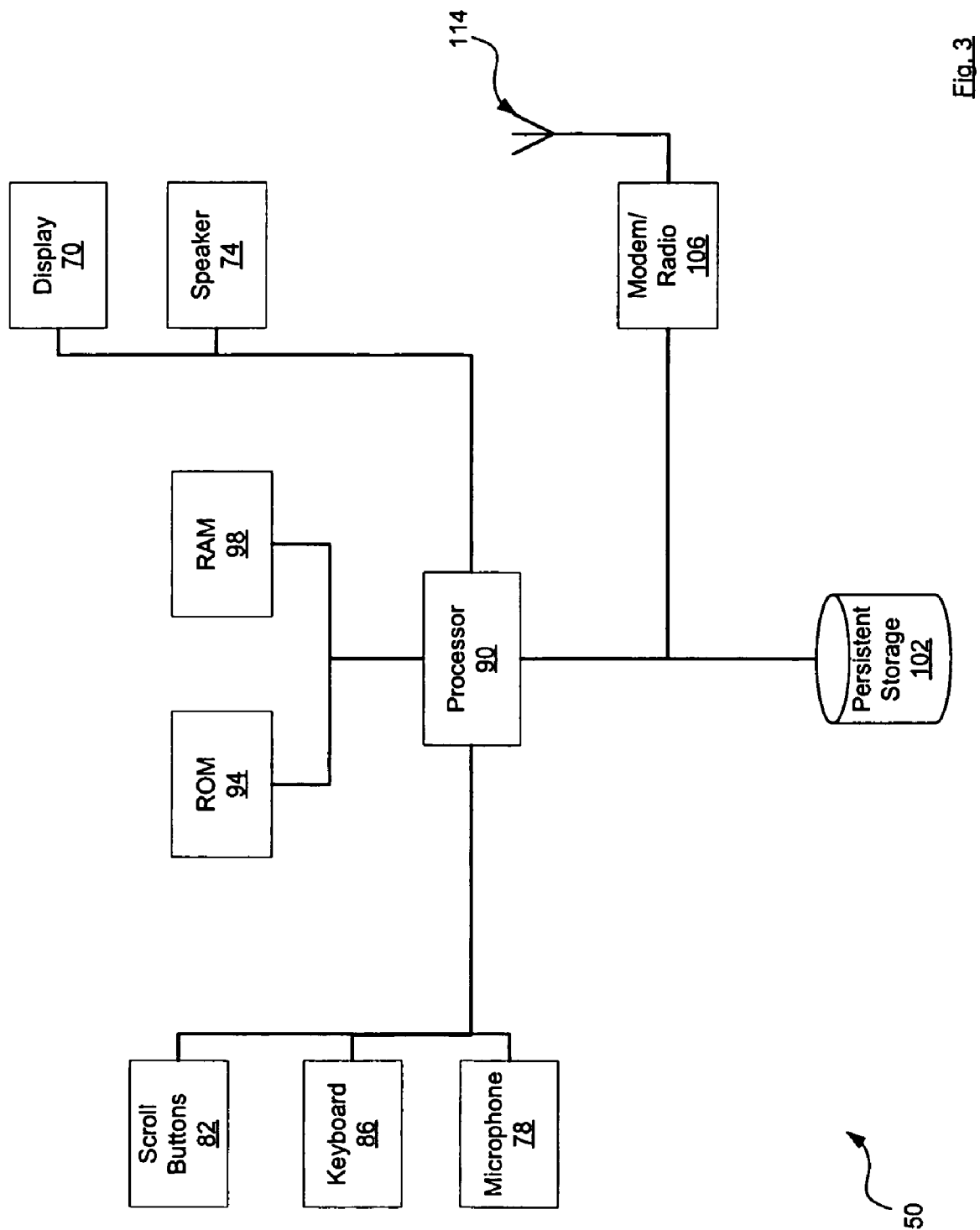
FIG. 3 is a block diagram of certain internal components of a mobile electronic device of FIG. 1.

Referring now to FIG. 3, a block diagram of certain internal components within cell-phone 50 are shown. Cell-phone 50 is based on a microcomputer that includes a processor 90. Processor 90 is connected to a read-only-memory ("ROM") 94, which contains a plurality of applications executable by processor 90 that enables cell-phone 50 to perform certain functions. Processor 90 is also connected to a random access memory unit ("RAM") 98 and a persistent storage device 102 which is responsible for various non-volatile storage functions of cell-phone 50. Processor 90 can send output signals to various output devices including display 70 and speaker 74. Processor 90 can also receive input from various input devices including microphone 78 and keyboard 86. Processor 90 is also connected to a modem and radio 106. Modem and radio 106 are operable to connect cell-phone 50 to wireless base stations 34 in range of cell-phone 50, in the usual manner, via an antenna 114.

Referring back to FIG. 1, each cell-phone 50 maintains a common policy ("CP") database 100, used for determining which received calls should be accepted. CP database 100 is the same for all cell-phones 50. Table I shows an example CP database 100 for cell-phones 50 right before an attempt is made, by phone $58_1$, to place a call.

TABLE I

| Example CP Database 100 |
| --- |
| Field 1 |
| OID |
| 416 000-0002 |
| 647 000-0002 |

Describing Table I in greater detail, Field 1 contains the unique OID associated with a phone or a cell-phone. In this embodiment, as mentioned above, the OID is the phone number associated with a phone or a cell-phone. It is impermissible for cell-phones 50 to receive calls from phones or cell-phones listed in this table. For example, in this case, it is impermissible for cell-phones 50 to accept calls placed by phone $58_2$ (which has an OID of 416 000-0002), or by cell-phone $50_2$ (which has an OID of 647 000-0002).

Figure 4:
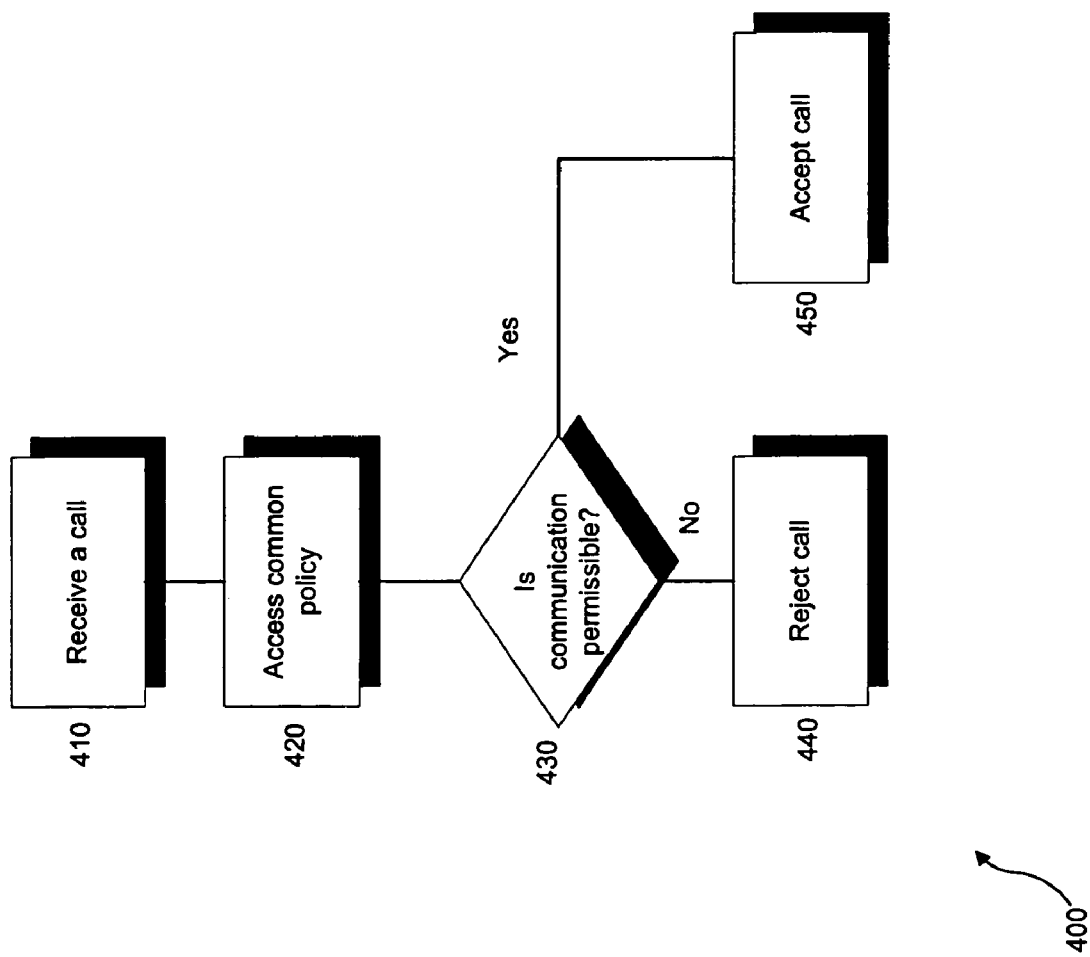
FIG. 4 is a flowchart depicting a method of processing communications in accordance with an embodiment of the invention.

Referring to FIG. 4, a method for processing communications in a network having CP database 100 is indicated generally at 400. In order to assist in the explanation of the method, it will be assumed that method 400 is operated using system 30, and that, as shown in FIG. 1, cell-phone $50_1$ is located within range of base station $34_1$, cell-phone $50_2$ is located within in range of base station $34_2$ and cell-phone $50_3$ is located within peer-to-peer range of cell-phone $50_1$. Furthermore, the following discussion of method 400 will lead to further understanding of system 30 and its various components. (However, it is to be understood that system 30 and/or method 400 can be varied, and need not work exactly as discussed herein in conjunction with each other, and that such variations are within the scope of the present invention).

The current performance of method 400 is initiated by a call placed by phone $58_1$. Referring back to FIG. 4, at step 410 a call is received. Step 410 can be performed, for example, by phone $58_1$ dialing the phone number for cell-phone $50_1$. Accordingly, an attempt is made, in the usual manner, to create a connection with cell-phone $50_1$ through PSTN network 42, and, with the aid of station $34_1$, through link $38_1$. In the present embodiment, the phone number of phone $58_1$, 416 000-0001, is forwarded to cell-phone $50_1$ as part of the attempt to establish a connection. In other embodiments, other identifiers which uniquely identify the originator of a call in a phone network, such as the name under which a phone is registered, can also be used, and are within the scope of the invention.

Continuing with the example, at step 420 the common communication policy is accessed. In this example, step 420 is performed by accessing CP database 100 maintained on cell-phone $50_1$ itself, as described above. Method 400 then advances from step 420 to step 430, at which point a determination is made as to whether the received communication is permissible. In this example, CP database 100 is examined to determine whether calls from $58_1$ are permitted. To perform this step, CP database 100 is accessed to determine whether the phone number of phone $58_1$, the originator phone, is present in CP database 100. In this case, the phone number 416 000-0001 is not present in CP database 100 meaning that accepting a phone call from phone $58_1$ is permissible. Accordingly, step 450 is performed next, and the call is accepted in the usual manner. For example, cell-phone $50_1$'s ringer can be sounded if cell-phone $50_1$ is on, or the call can be directed to a voice mail if cell-phone $50_1$ is off. These and other known manners of accepting a call are within the scope of the invention.

To further illustrate method 400, it is assumed that method 400 is performed by system 30 a second time, but in this second performance, the phone call initiating the performance of method 400 originates from phone $58_2$. Accordingly, at step 410 the phone number 416 000-0002, which is associated with phone $58_2$, is transmitted to cell-phone $50_1$ as part of the attempt to establish a connection with phone $50_1$. At step 410, CP database 100 is accessed in substantially the same manner as the first performance of method 400. However, during the second performance of step 430, accessing CP database 100 reveals that phone number 416 000-0002 is present in CP database 100. Accordingly; step 440 is performed next, rejecting the call placed by phone $58_2$. Step 440 can be performed in a variety of known ways. For example, the connection can be dropped, a disconnected number message can be played, or the call can be directed to a voice mail informing the originator that calls placed by them cannot be accepted. These and other known manners of rejecting a call are all within the scope of the invention.

In another embodiment, method 400 can be performed when the call originates from the same network that the receiving cell-phone $50_1$ is located on, which is in contrast to the first two example performances of method 400 where the call originated on a different network. To illustrate this embodiment, an example is used where the originator is another cell-phone, cell-phone $50_2$ in FIG. 1. Accordingly, when cell-phone $50_2$ attempts to place a call to cell-phone $50_1$, method 400 is performed in substantially the same manner as the last two example performances. Specifically, the performance of the first two steps leads to the reception of cell-phone $50_2$'s phone number, 647 000-0002, by cell-phone $50_1$, and the accessing of CP database 100. When step 430 is performed, a search of CP database 100 reveals that 647 000-0002 is contained within CP database 100 leading to the performance of step 440, namely the rejection of the call.

Although in the previous embodiments the voice call is received from a PSTN and a cellular phone network, in other embodiments, method 400 can also be performed using other types of connections such as peer-to-peer links; all these embodiments are within the scope of the invention. For example, method 400 can be performed when a voice communication is attempted between two cell-phones through a peer-to-peer link. To illustrate this embodiment, consider the example shown in FIG. 1 where cell-phone $50_3$ attempts to establish voice communications with $50_1$ through a peer-to-peer link 54. Accordingly, at step 410, as in the previous three example performances of method 400, the phone number associated with cell-phone $50_3$ (647 000-0003), is transmitted to cell-phone $50_1$ as part of an attempt to establish a connection with phone $50_1$. After CP database 100 is accessed at step 420, and examined at step 430, it is found that 647 000-0003 is not in database 100, and hence, determined that receiving the voice communication from cell-phone $50_3$ is permissible. Thus, method 400 advances to step 450 and the voice communication is accepted by cell-phone $50_3$ in the usual manner.

Figure 5:
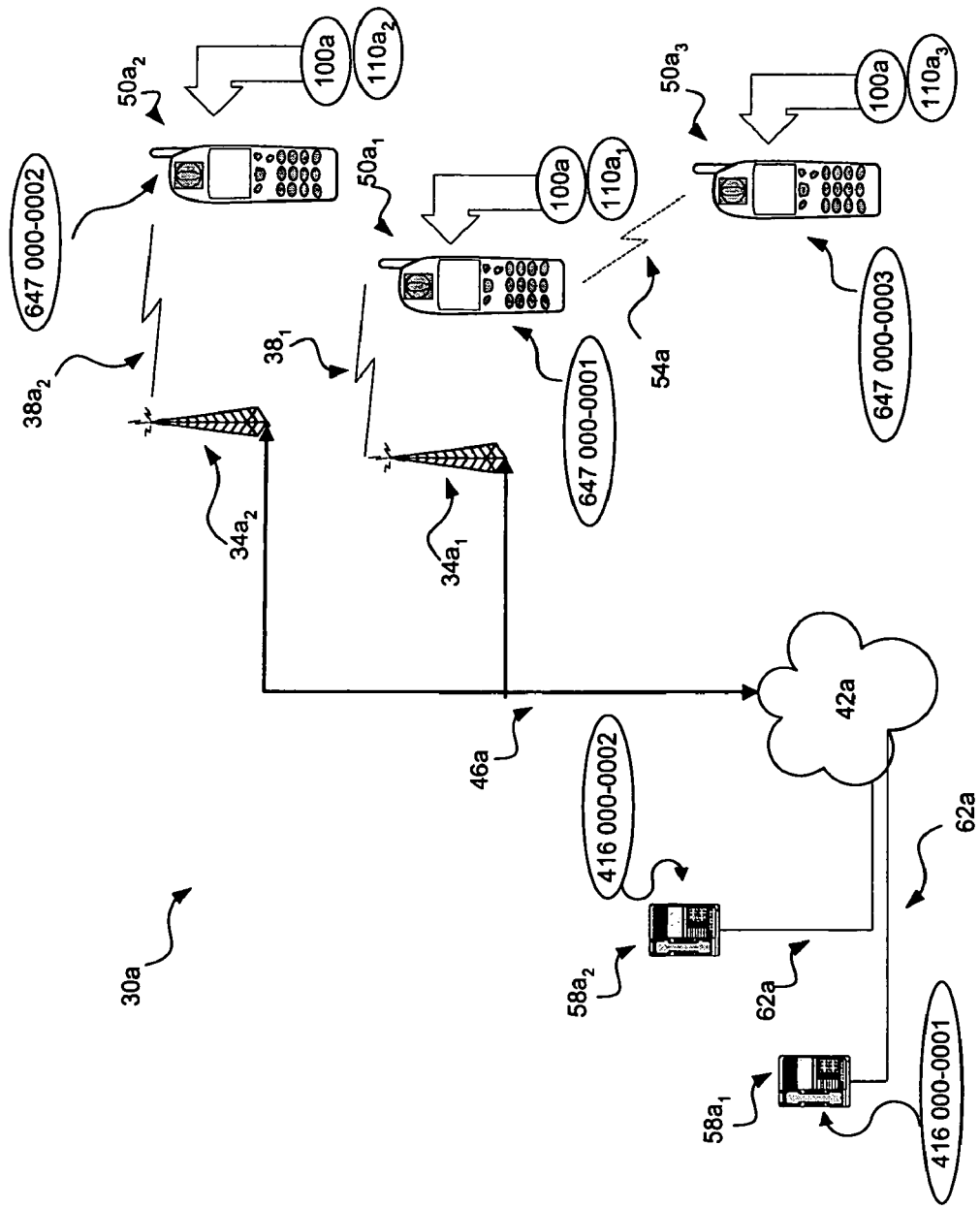
FIG. 5 is a block diagram of a system for managing a communication policy in accordance with another embodiment of the invention.

Referring now to FIG. 5, a wireless communication system in accordance with another embodiment of the invention is indicated generally at 30a. System 30a is substantially the same as system 30, and like elements in system 30a bear the same reference as like elements in system 30, except followed by the suffix "a". System 30a differs from system 30 in that in system 30a each cell-phone 50a maintains an override policy ("OP") database 110a unique to that cell-phone 50a. In the present example, OP database 110a is an opt-out policy database used for determining whether, for a given call, the common policy contained in CP database 100 should be opted out of.

Referring back to FIG. 5, each cell-phone 50a maintains two policies, one in OP database 110a, and the other in CP database 100a. An example CP database 100a is shown above in Table I. Table II shows an example OP database 110a, for cell-phone $50a_1$ right before an attempt is made, by phone $58a_2$, to place a call.

TABLE II

| Example CP Database 110 for 50a₁ |
| --- |
| Field 1 |
| OID |
| 647 000-0002 |

Describing Table II in greater detail, Field 1 contains the unique OID associated with a phone 58a or a cell-phone 50a. In this embodiment, as mentioned above, the OID is the phone number associated with a phone 58a or a cell-phone 50a. If a phone 58a or cell-phone 50a is identified in OP database 110a, the common policy represented by CP database 100a is ignored for that device. For example, although, according to common policy 100a, as shown in Table I, it is impermissible for cell-phones 50a to accept calls placed by phone 582 (which has an OID of 416 000-0002), the same OID is also listed in OP database $110a_1$, overriding CP database 100a and making the reception of calls from phone $58_2$ permissible for cell-phone $50a_1$.

Figure 6:
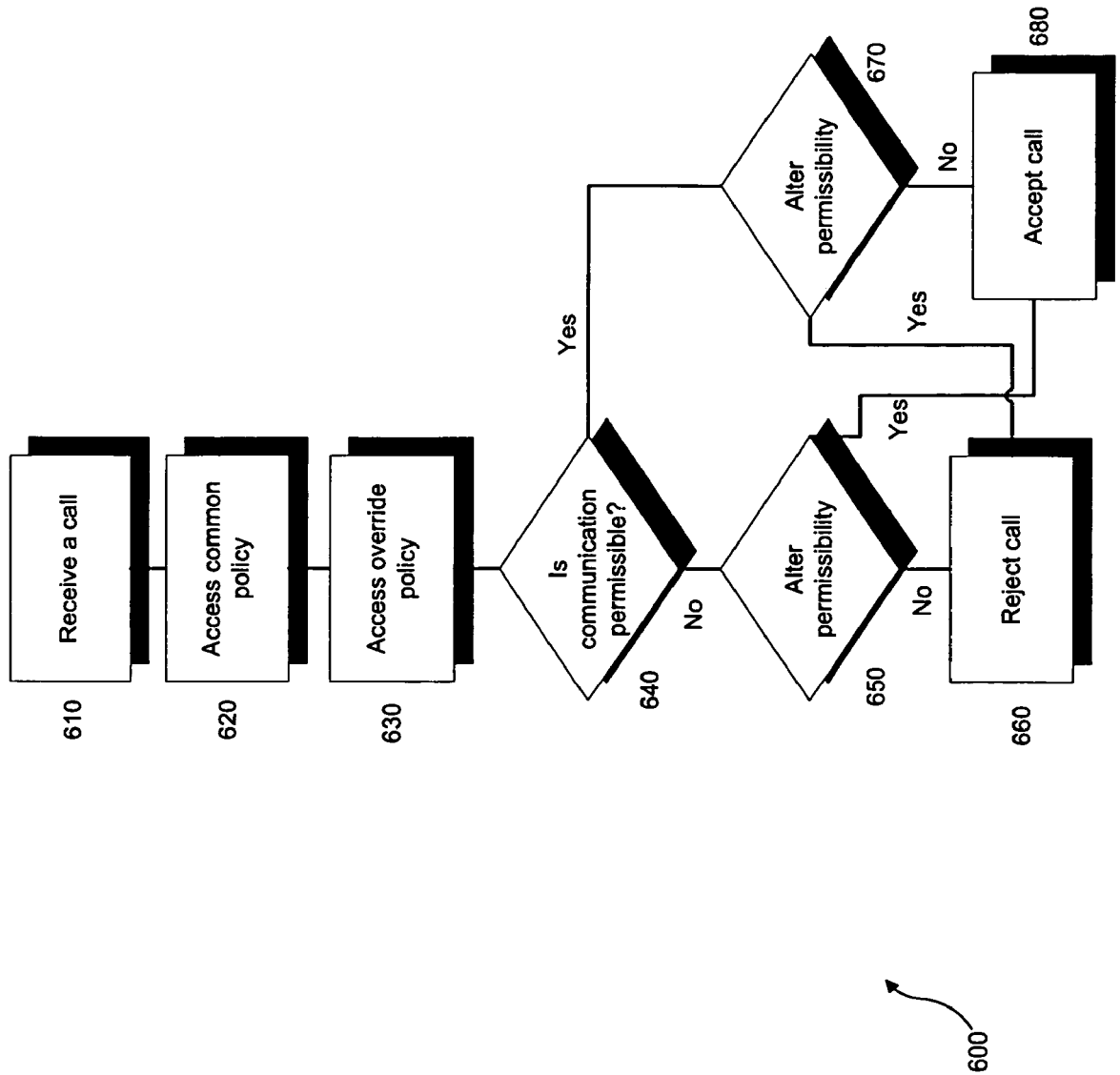
FIG. 6 is a flowchart depicting a method of processing communications in accordance with another embodiment of the invention.

Referring to FIG. 6, a method for processing communications in a network having CP database 100a and OP databases 110a is indicated generally at 600. In order to assist in the explanation of the method, it will be assumed that method 600 is operated using system 30a. Furthermore, the following discussion of method 600 will lead to further understanding of system 30a and its various components. (However, it is to be understood that system 30a and/or method 600 can be varied, and need not work exactly as discussed herein in conjunction with each other, and that such variations are within the scope of the present invention).

Similar to the second example performance of method 400 using system 30, the current performance of method 600 is initiated by a call placed by phone $58a_2$. Accordingly, the performance of steps 610 and 620 result in the reception of phone $58a_2$'s associated phone number and the accessing of CP database 100a. Continuing with the example, at step 630, the override policy is accessed. In this example, step 630 is performed by accessing OP database 110a maintained on cell-phone $50a_1$ itself. Method 600 then advances from step 630 to step 640, at which point a determination is made as to whether the received voice call is permissible. In this example, CP database 100a is examined to determine whether calls from $58a_2$ are permitted. To perform this step, database 100a is accessed to determine whether the phone number of phone $58a_2$, the originator phone, is present database 100a. In this case, the phone number 416 000-0002 is present in database 100a meaning that accepting a phone call from phone $58a_2$ is not permissible. Accordingly, step 650 is performed next.

At step 650, a determination is made whether to alter the permissibility of the call. In this example, OP database 110a is examined to determine whether the common policy for $58a_2$ should be ignored. To perform this step, database 110a is examined to determine whether the phone number of phone $58a_2$, the originator phone, is present database 110a. In this case, the phone number 416 000-0002 is present in CP database 110a, meaning that the common policy should be ignored, altering the permissibility determined at step 640 to make a phone call from phone $58a_2$ permissible. Accordingly, step 680 is performed next.

At step 680 the call is accepted in the usual manner. For example, cell-phone $50_1$'s ringer can be sounded if cell-phone $50_1$ is on, or the call can be directed to a voice mail if cell-phone $50_1$ is off. These and other known manners of accepting a call are within the scope of the invention.

In another embodiment, OP database 110a can represent an opt-in policy used for determining whether, for a given call, the common policy contained in CP database 100a should be followed. For example, according to common policy 100a, as shown in Table I, it is impermissible for cell-phones 50a to accept calls placed by phone $58_2$ (which has an OID of 416 000-0002). The same OID is also listed in OP database $110a_1$, opting in to the policy contained in CP database 100a and making the reception of calls from phone $58_2$ impermissible for cell-phone $50_{a_1}$.

Referring back to FIG. 6, a second example performance of method 600 will be used to illustrate an embodiment of method 600 where OP database 110a represents an opt-in policy. As in the first Performance of method 600 where OP database 110a represents an opt-out policy, it is assumed that this performance of method 600 is initiated by call placed by phone $58a_2$. It should be noted that the performance of method 600, regardless of the type of policy represented by OP database 110a, is the same except for the determination of whether to alter permissibility at steps 650 and 670. Accordingly, the performance of steps 610 through 630 according to this embodiment results in the reception of phone $58a_2$'s associated phone number, the accessing of CP database 100a, and the OP database $100a_1$.

Method 600 then advances from step 630 to step 640, at which point a determination is made as to whether the received voice call is permissible. In this example, similar to the first performance of method 600, CP database 100a is examined to determine that calls from $58a_2$ are not permissible. Accordingly, step 650 is performed next.

At step 640, a determination is made whether to alter the permissibility of the call. In this example, OP database 110a is examined to determine whether the common policy for $58a_2$ should be followed. To perform this step, database 110a is searched to determine whether the phone number of phone $58a_2$, the originator phone, is present in database 110a; only if OP database 110a also contains the phone number of phone $58a_2$, will the common policy making a call from phone $58a_2$ impermissible be enforced. In this case, phone number 416 000-0002 is present in CP database 110a, meaning that the common policy should be followed, requiring no alterations to the permissibility determined at step 640. Accordingly, step 680 is performed next.

At step 680 the call is rejected. Specifically, the call placed by phone 582 is rejected. Step 680 can be performed in a variety of known ways. For example, the connection can be dropped, or the call can be directed to a voice mail informing the originator that calls placed by them cannot be accepted. These and other known manners of rejecting a call are all within the scope of the invention.

As with method 400, in other embodiments, method 600 can be performed when the call originates from the same network that the receiving cell-phone $50_1$ is located on. Moreover, in yet other embodiments, method 600 can also be performed using other types of connections such as peer-to-peer links. All these embodiments are within the scope of the invention.

Figure 7:
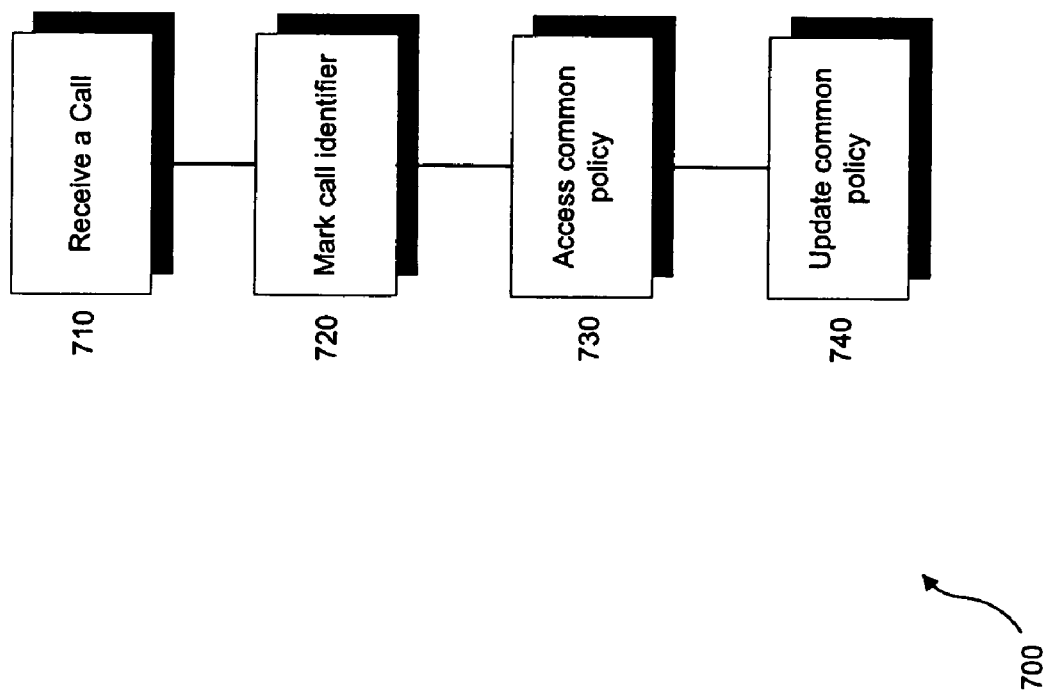
FIG. 7 is a flowchart depicting a method of updating information in accordance with an embodiment of the invention.

Referring to FIG. 7, a method for updating a common communication policy for a network having a plurality of cell-phones is indicated generally at 700. In order to assist in the explanation of the method, it will be assumed that method 700 is operated using system 30, and that, as shown in FIG. 1, cell-phone $50_1$ is located within range of base station $34_1$, cell-phone $50_2$ is located within in range of base station $34_2$ and cell-phone $50_3$ is located within peer-to-peer range of cell-phone $50_1$. In addition, it is assumed that, immediately prior to the performance of Method 700, CP database 100's contents are as shown in Table I above. Furthermore, the following discussion of method 700 will lead to further understanding of system 30 and its various components. (However, it is to be understood that system 30 and/or method 700 can be varied, and need not work exactly as discussed herein in conjunction with each other, and that such variations are within the scope of the present invention).

The current performance of method 700 is initiated by a call placed by phone $58_1$. Referring back to FIG. 7, at step 710 a call is received. Step 710 can be performed, for example, by phone $58_1$ dialing the phone number for cell-phone $50_1$. Accordingly, an attempt is made, in the usual manner, to create a connection with cell-phone $50_1$, through PSTN network 42, and, with the aid of station $34_1$, through link $38_1$. In the present embodiment, the phone number of phone $58_1$, 416 000-0001, is forwarded to cell-phone $50_1$ as part of the attempt to establish a connection. In other embodiments, other identifiers which uniquely identify the originator of a call in a phone network, such as the name under which a phone is registered, can also be used, and are within the scope of the invention.

Continuing with the example, at step 720 the phone number received at step 710 is marked. In this example, the number associated with phone $58_1$, 416 000-0001 is marked. Method 700 then advances from step 720 to step 730 where the common communication policy is accessed. In this example, step 730 is performed by accessing CP database 100 maintained on cell-phone $50_1$.

Next, at step 740 the common policy is updated with the marked identifier. In this example, CP database 100 is first examined to determine whether the marked number of phone $58_1$, the originator phone, is present in CP database 100. In this case, the phone number 416 000-0001 is not present in CP database 100 meaning that accepting a phone call from phone $58_1$ is permissible. Accordingly, CP database 100 is updated by inserting the marked number 416 000-0001 such that calls from phone $58_1$ are now impermissible according to CP database 100. It should apparent to those skilled in the art that the steps of accessing and updating should not be construed in the limiting sense, and that in other embodiments the two steps could be combined to form one step.

Figure 8:
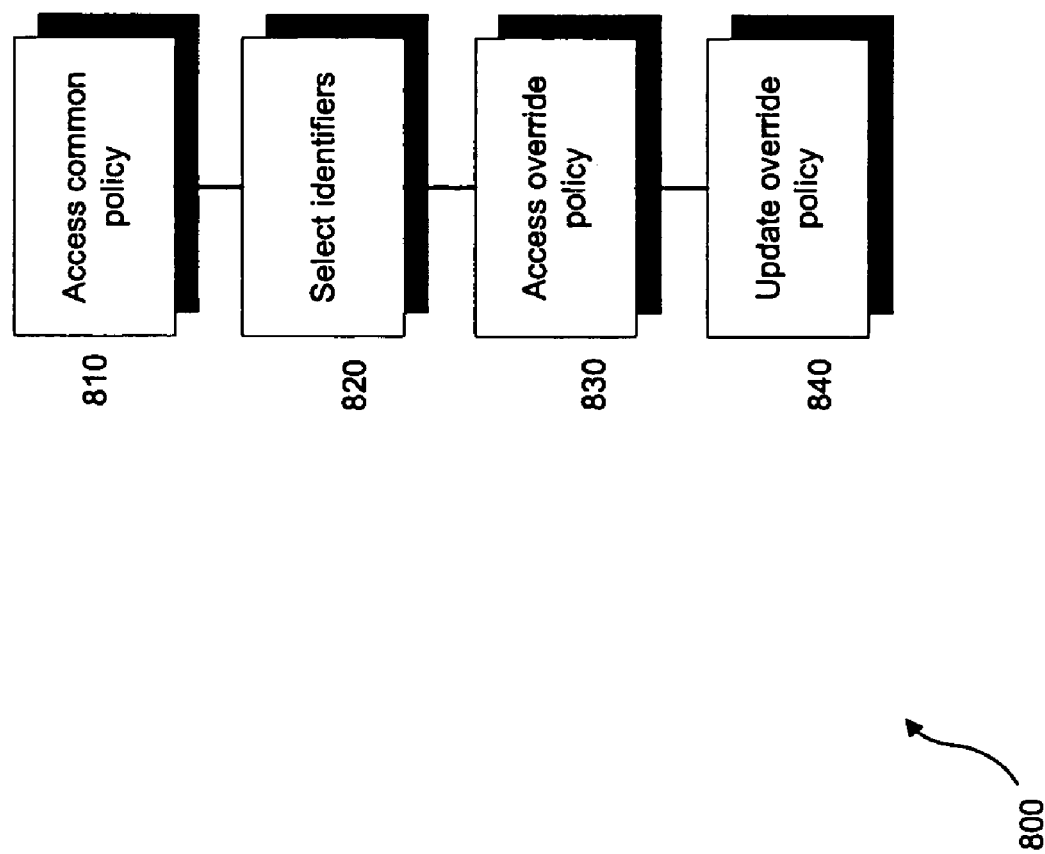
FIG. 8 is a flowchart depicting a method of updating information in accordance with an embodiment of the invention.

In another embodiment of the invention, as shown in FIG. 5 and discussed above, individual cell-phones can maintain override policies for overriding a policy common to all cell-phones. Referring to FIG. 8, a method for updating an override policy for an individual cell-phone which is part of a network having a common communication policy is indicated generally at 800. In order to assist in the explanation of the method, it will be assumed that method 800 is operated using system 30a. In addition, it is assumed that, immediately prior to the performance of Method 800, CP database 100a's contents are as shown above in Table I, and OP database 110a's contents are as shown above in Table II. Furthermore, the following discussion of method 800 will lead to further understanding of system 30a and its various components. (However, it is to be understood that system 30a and/or method 600 can be varied, and need not work exactly as discussed herein in conjunction with each other, and that such variations are within the scope of the present invention).

Referring back to FIG. 8, at step 810 a common communication policy is accessed. In this example, step 810 is performed on cell-phone 50a, by accessing CP database 100a maintained on cell-phone $50a_1$.

Next, at step 820 one or more identifiers are selected. In this example, the identifier CP database 100a is first examined to identify the numbers it contains, and following that, 416 000-0002, one of the phone numbers present in CP database 100a, is selected from the list of numbers first identified. Next, at step 830, the override policy is accessed. In this example, step 830 is performed by accessing OP database 110a maintained on cell-phone $50a_l$.

Next, at step 840, the override database is updated. In this case, OP database 110a is updated by inserting the selected number 416 000-0002. In one embodiment, the override policy is an opt-out policy. Accordingly, by updating the OP database in step 840 to include 416 000-0002 cell-phone 50a₁ ignores the common policy, and makes calls from phone 58a₂ permissible. In another embodiment, the override policy can be an opt-in policy. Accordingly, by updating the OP database in step 840 to include 416 000-0002 cell-phone 50a₁ follows the common policy, and in accordance with the common policy, receiving calls from phone 58a₂ becomes impermissible.

Figure 9:
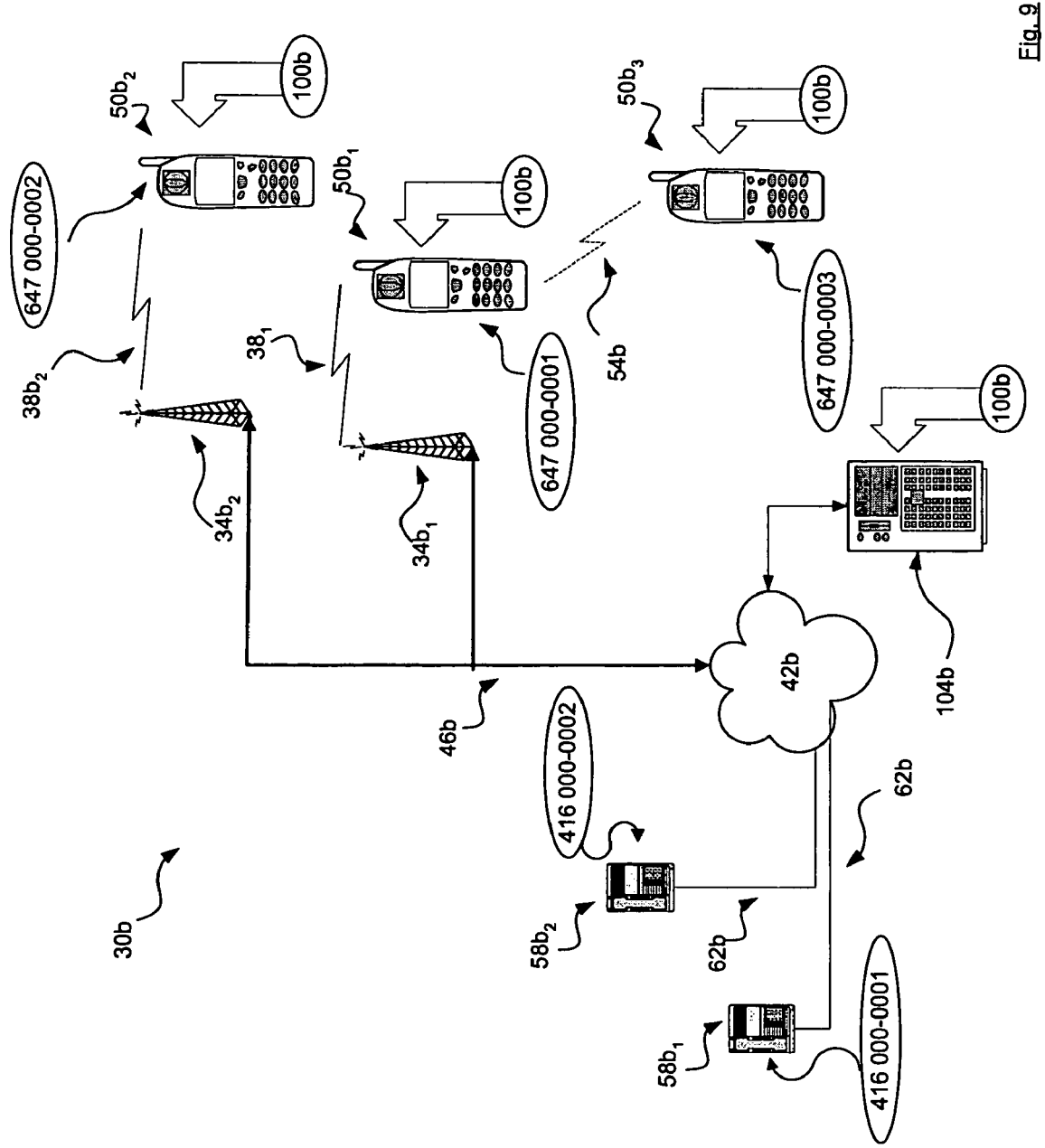
FIG. 9 is a block diagram of a system for managing a communication policy in accordance with another embodiment of the invention.

Referring now to FIG. 9, a wireless communication system in accordance with another embodiment of the invention is indicated generally at 30b. System 30b is substantially the same as system 30, and like elements in system 30b bear the same reference as like elements in system 30, except followed by the suffix "b". System 30b also shows a policy server 104b which maintains a central, up-to-date copy of CP database 100a. Policy server 104b is thus connected to network 42b and is therefore accessible to all phones 50b and base stations 34b within system 30b. Thus, as CP database 100b is updated, it is centrally maintained by server 104b and such updates can be periodically pushed to (or pulled by) all phones 50b. Also, as new, additional phones 50b are provisioned in system 30b, the latest version of CP database 100b can be stored on those new phones 50b by obtaining a copy of CP database 100b from server 104b. Methods and means for propagating updates to CP database 100b from server 104b to all phones 50b are not particularly limited. Likewise, method and means for providing that CP database 100b is synchronized in all locations is not particularly limited.

Figure 10:
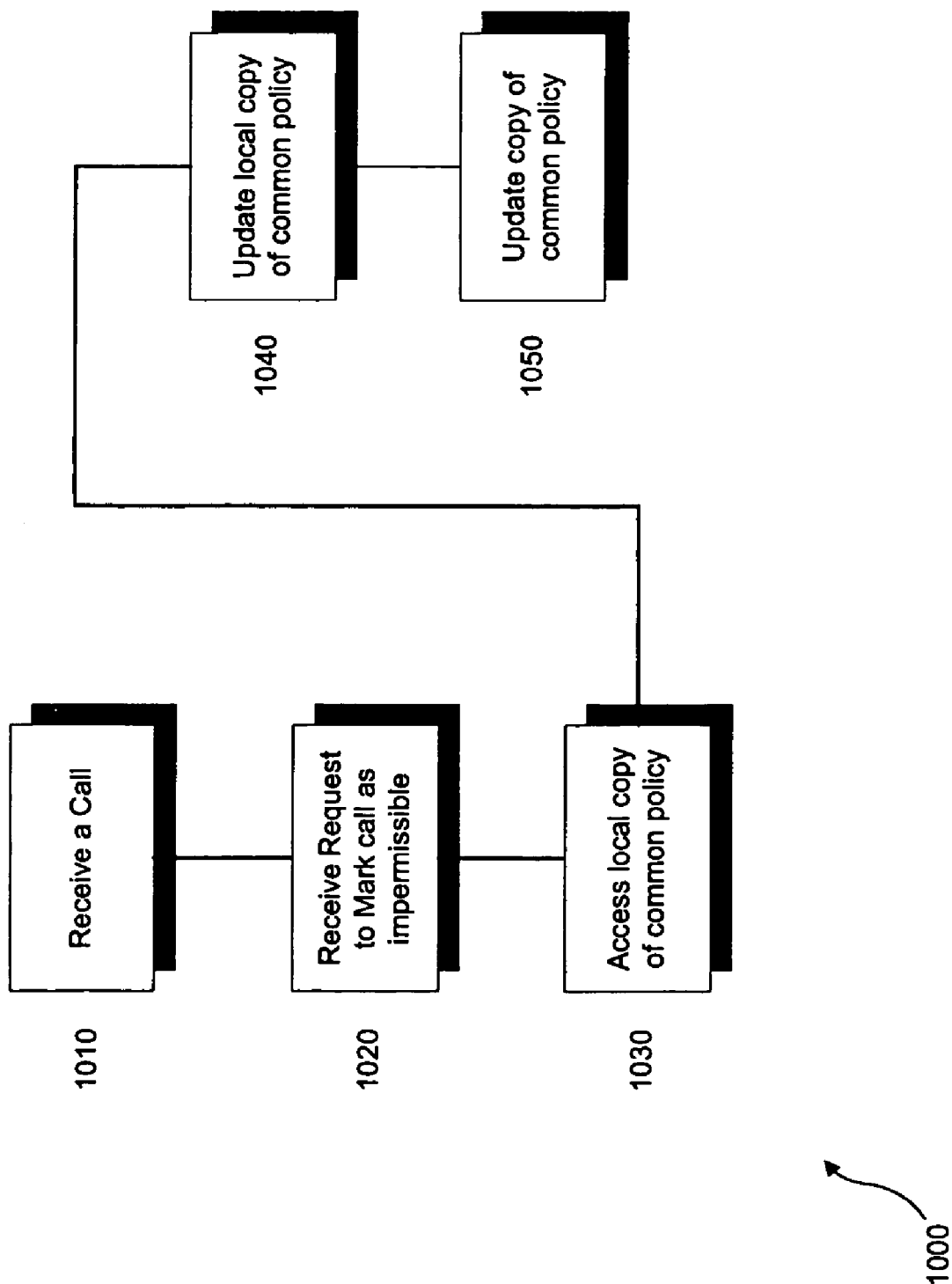
FIG. 10 is a flowchart depicting a method of updating information in accordance with an embodiment of the invention.

Referring now to FIG. 10, a method of updating a communication policy in accordance with another embodiment of invention represented as a flow-chart and indicated generally at 1000. Method 1000 can be performed using system 30b, as an example. Before discussing this example, it will be assumed that, prior to the performance of method 1000, all copies of CP database 100b are initially empty, as shown in according to Table III.

TABLE III

Example CP Database 100b
Field 1
OID (Empty)

Figure 11:
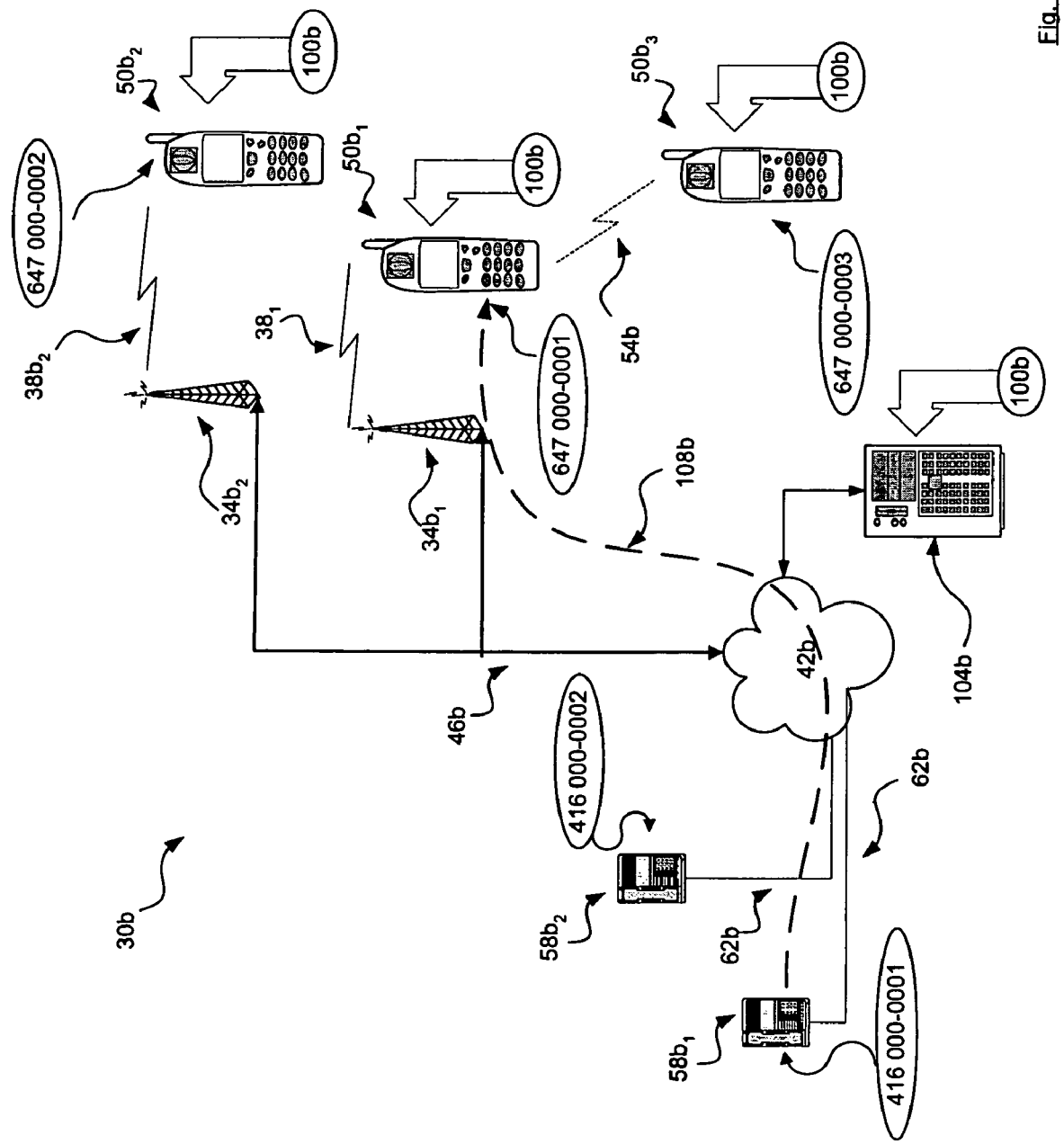
FIG. 11 is a block diagram of a system for managing a communication policy in accordance with another embodiment of the invention.

Beginning first at step 1010, a call is received. In this example, it will be assumed that a call is initiated from phone 58b₁ which is directed to cell-phone 50b₁. This step is represented in FIG. 11, as a call initiated from phone 58b, and directed to cell-phone 50b₁ is indicated at 108b. Step 1010 occurs in the usual manner.

Figure 12:
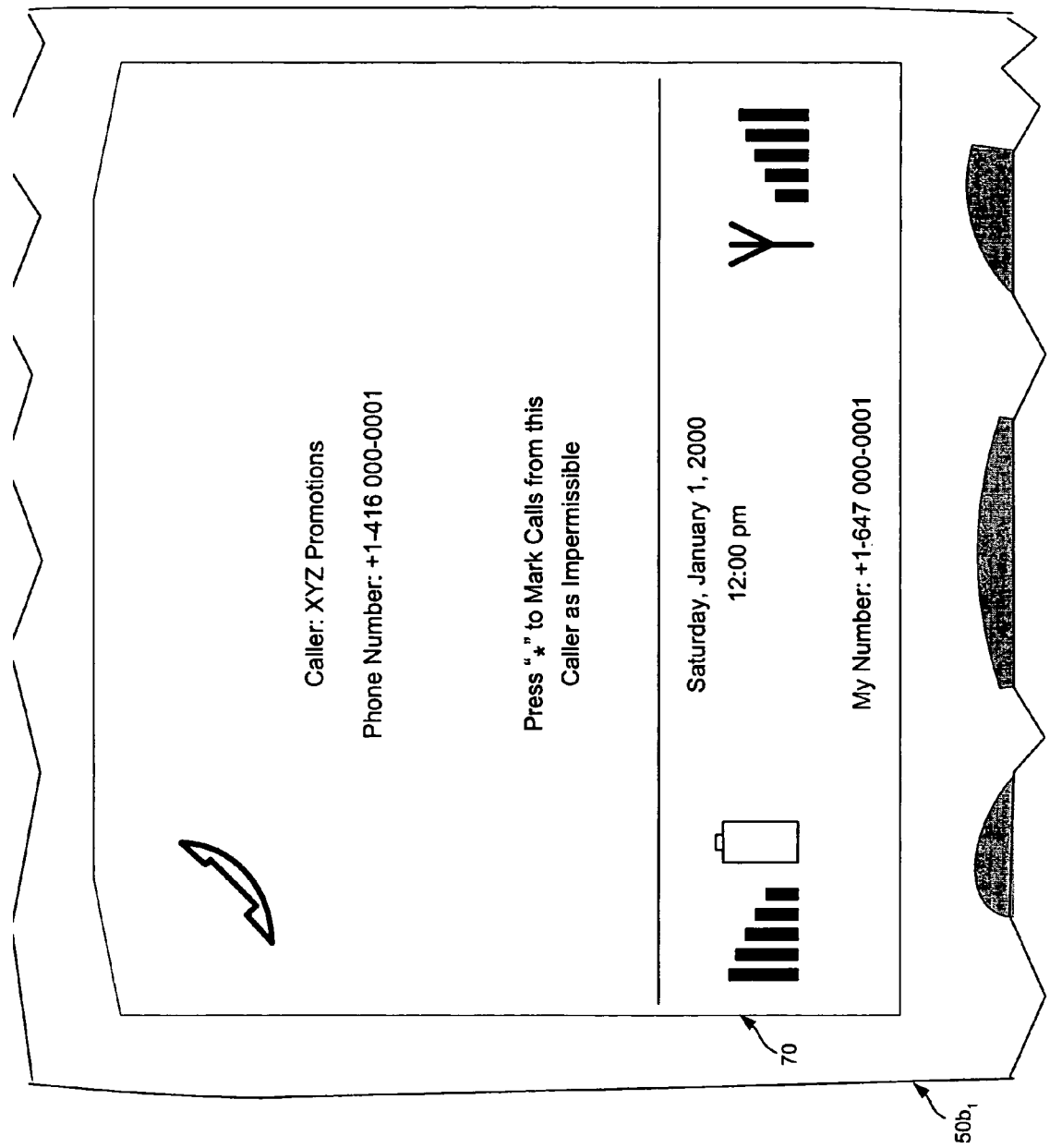
FIG. 12 is a representation of certain information being displayed of the mobile subscriber device of FIG. 9.

Next, at step 1020, a request is received to mark the call is impermissible. In this example, the request is received from the user operating cell-phone 50b₁. For example, the user operating cell-phone 50b₁ can be presented with the information as displayed in FIG. 12, whereby the user is informed that s/he can press the "*" key on the phone in order to mark that future calls from the caller (i.e. from phone 58b₁) as impermissible. Step 1020 can be performed either while call 108b is in progress, or simply while call 108b is incoming but has not been answered. Thus, in this example, it will be assumed that the user operating cell-phone 50b₁ actually depresses the "*" key at this step, thereby completing step 1020. (Concurrently with depression of the "*" key, it can be desired to have cell-phone 50b₁ automatically drop call 108b.)

Method 1000 then advances from step 1020 to step 1030 where the common communication policy is accessed. In this example, step 1030 is performed by processor 90 of cell-phone 50b₁ accessing CP database 100b stored in persistent storage 102 maintained on cell-phone 50b₁.

Figure 13:
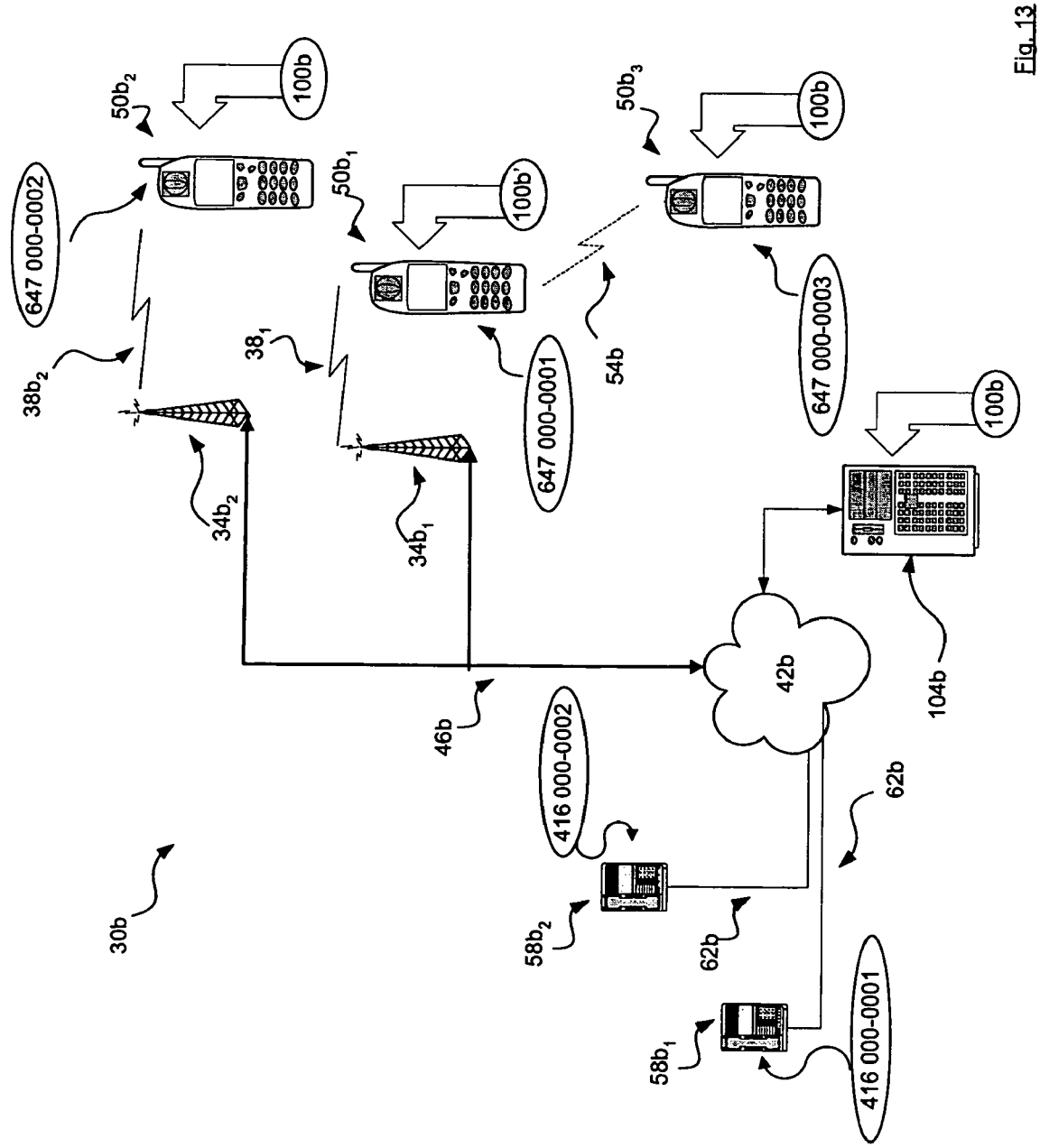
FIG. 13 is a block diagram of a system for managing a communication policy in accordance with another embodiment of the invention.

Next, at step 1040, the local copy of the common policy is updated with the marked identifier. In this example, CP database 100b is first examined to determine whether the marked number of phone 58b₁, the originator phone. Processor 90 of cell-phone 50b₁ updates the local copy of CP database 100 by inserting the marked number 416 000-0001 such that calls from phone 58b₁ are now impermissible according to the local copy of CP database 100b. Performance of step 1040 is represented in FIG. 13, as the local copy of CP database 100b is now shown as updated and indicated at 100b'. Likewise, in Table IV, the contents of CP database 100b' are shown.

TABLE IV

Example CP Database 100b'
Field 1
OID 416 000-0001

Figure 14:
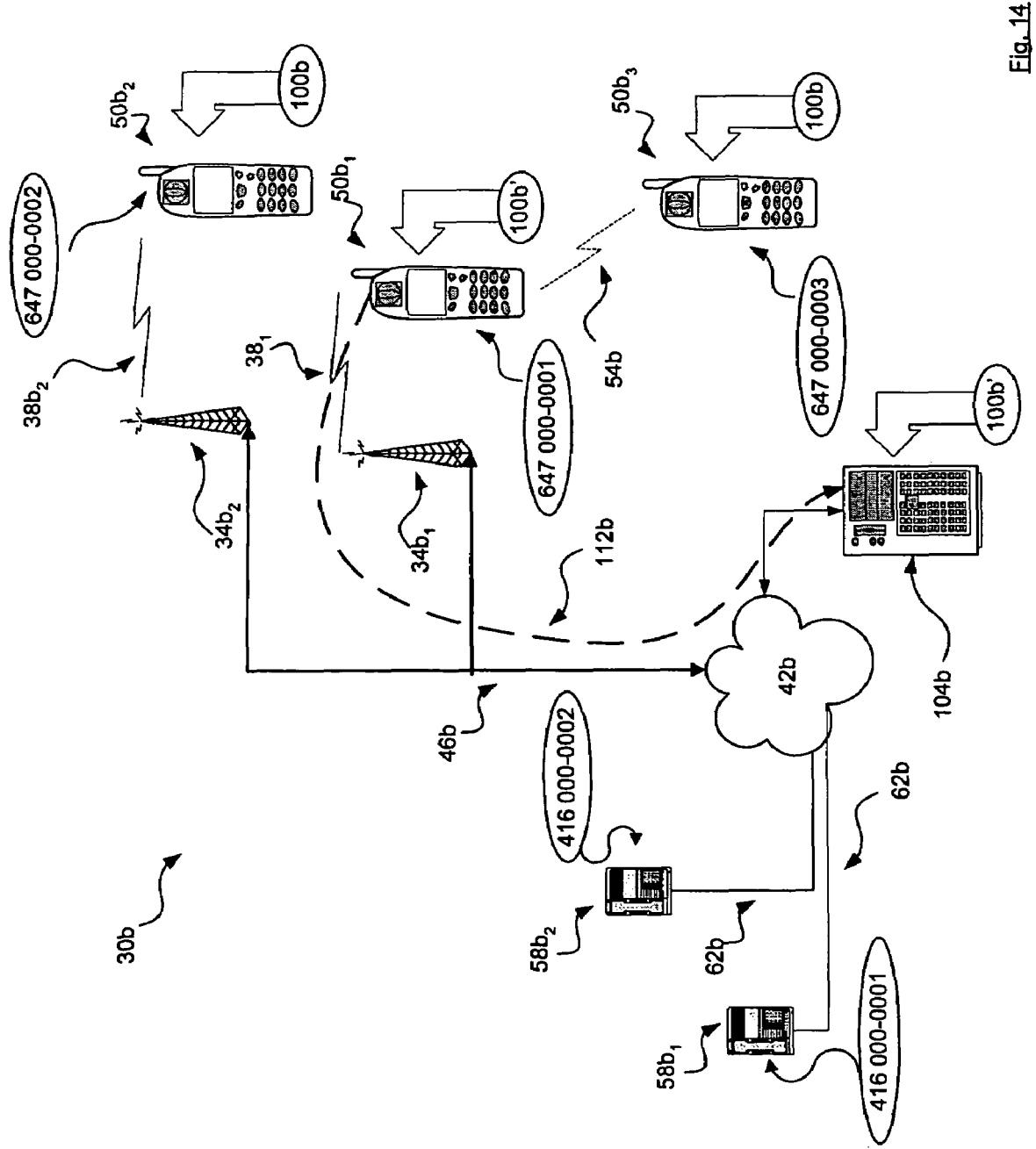
FIG. 14 is a block diagram of a system for managing a communication policy in accordance with another embodiment of the invention.

Next, at step 1050, the central copy of the common policy is updated. This step is performed by cell-phone 50b₁ which will send a copy of CP Database 100b' to policy server 104b. Step 1050 is represented in FIG. 14, as cell-phone 50b₁ sends a copy of CP Database 100b' to policy server 104b via pathway 112b, such that CP Database 100b' is now stored at policy server 104b.

Figure 15:
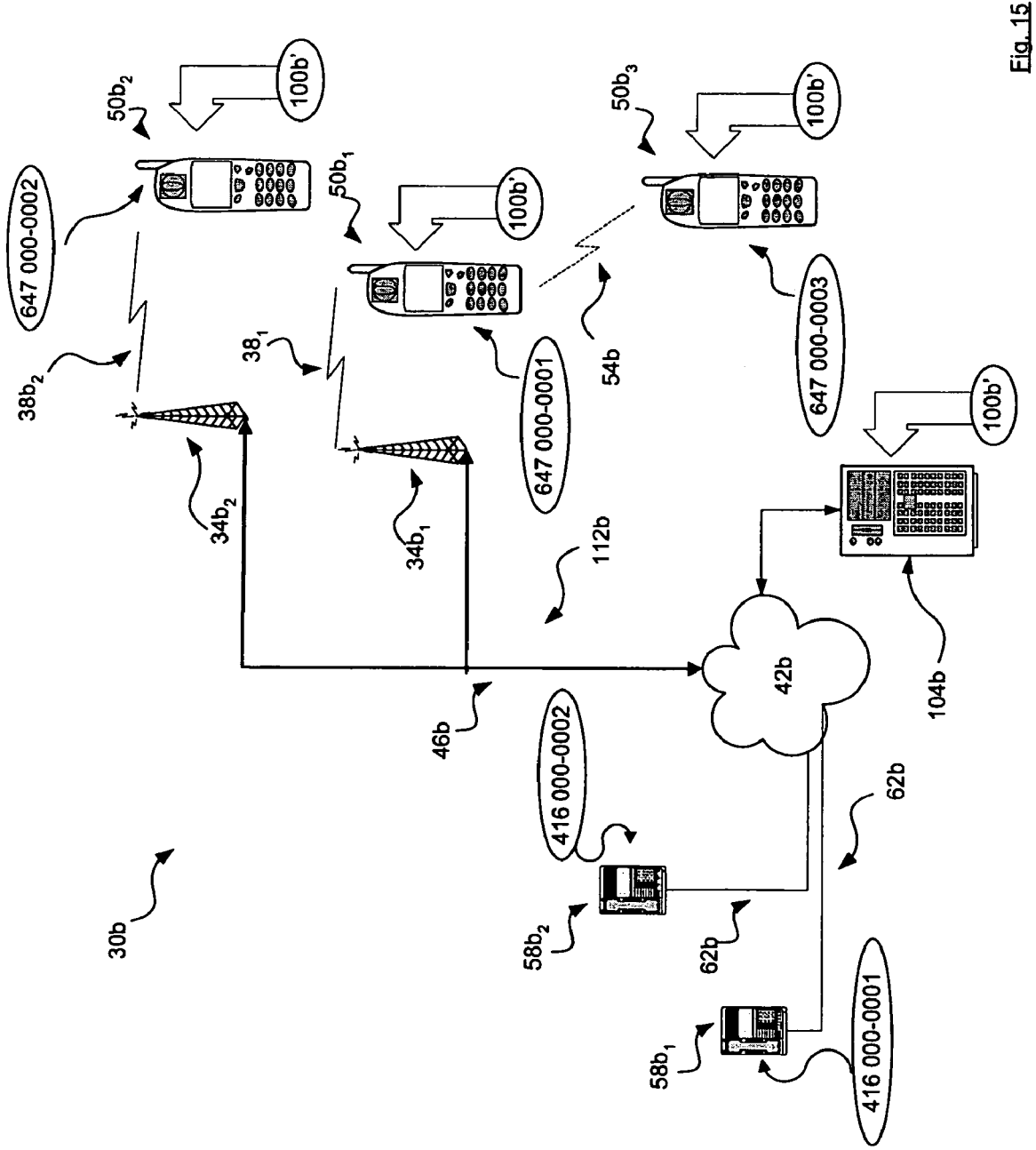
FIG. 15 is a block diagram of a system for managing a communication policy in accordance with another embodiment of the invention.

At this point, method 1000 ends. The updated CP Database 100b' at server 104b can now be processed in any desired manner, such as causing CP Database 100b' to be propagated to all cell-phones 50b in system 30b. Such a global update or synchronization can be effected in any desired manner, and is represented in FIG. 15. Having so propagated CP Database 100b' to all cell-phones 50b, now incoming calls from phone 58b, will not be permitted at any of cell-phones 50b.

Figure 16:
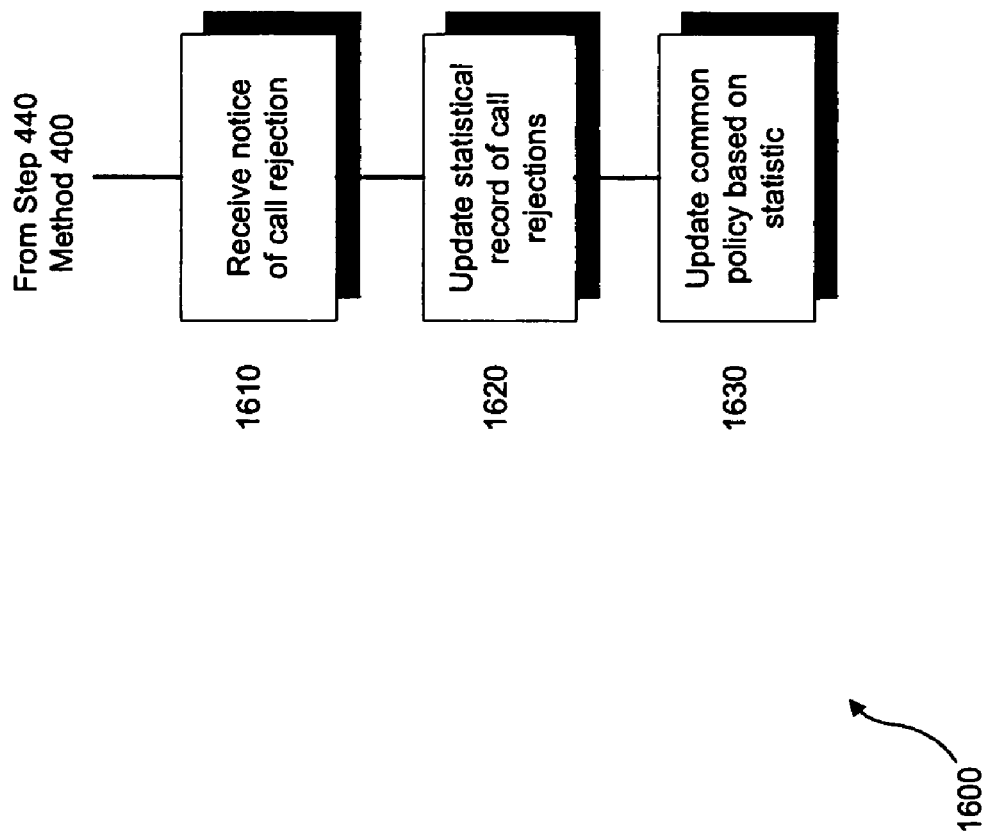
FIG. 16 is a flowchart depicting a method of updating information in accordance with an embodiment of the invention.

Referring now to FIG. 16, a method for updating a communication policy is indicated at 1600. Method 1600 is typically implemented on a system such as system 30b that has a policy server such as policy server 104b. Method 1600 relies first on the performance of method 400 on any cell-phone 50b in system 50b, which, after it rejects the call at step 440, sends a notice of the call rejection to policy server 104b. Thus, at step 1610 policy server 104b will first receive notice of the fact that a call rejection has occurred at cell-phone 50b. Next, at step 1620, an update to the record of call rejections will be made. Step 1620 is typically performed by policy server 104b, which will compile records about call-rejections in any desired manner. Policy server 104b can tabulate the number of times calls have been rejected from a particular number over a certain time period; and/or track the number of different cell-phones 50b which have rejected calls from a particular number. Where such rejections are statistically significant, then common policy 100b can be updated or maintained accordingly. For example, a long period without rejections may cause server 104b to remove a particular number from the common policy 100b, thereby making calls from such numbers once again permissible. In contrast, a large volume of rejections from a particular number may be used to determine that a particular number should remain as impermissible according to common policy 100b.

Figure 17:
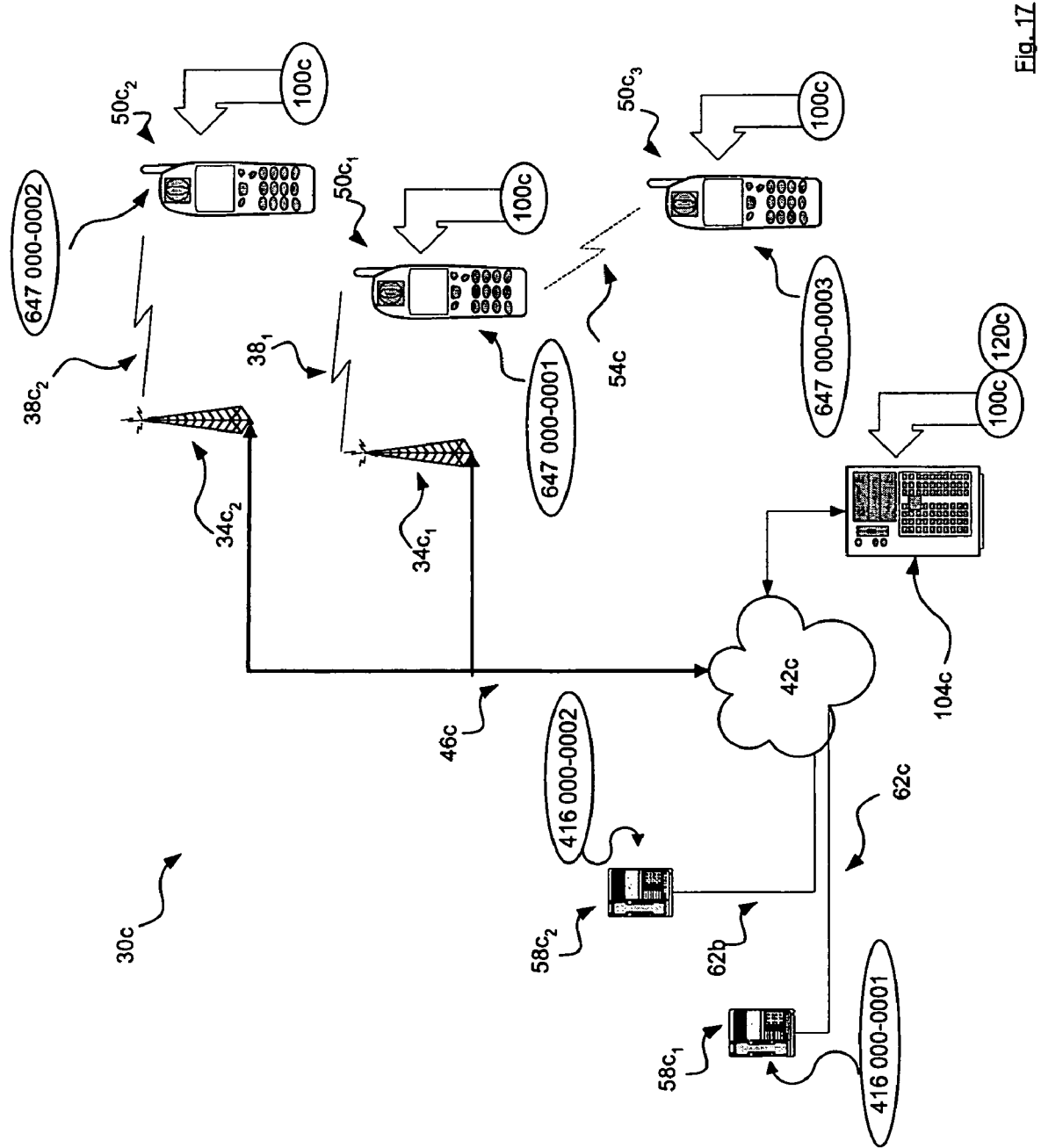
FIG. 17 is a block diagram of a system for managing a communication policy in accordance with another embodiment of the invention.

Referring now to FIG. 17, a wireless communication system in accordance with another embodiment of the invention is indicated generally at 30c. System 30c is substantially the same as system 30b, and like elements in system 30c bear the same reference as like elements in system 30b, except followed by the suffix "c" instead of the suffix "b". System 30c also includes a trust policy (TP) database 120c maintained on policy server 104c. TP database 120c includes indicators representing trust levels associated with phones 50c regarding allowability of changes to CP database 100c based on updates received from those phones 50c. More particularly, trust level indicators are used for generating a modification procedure to be performed when an updated local copy of CP 100c is received from a phone 50c. For example, in one embodiment, only updates from phones 50c with a high trust level indicator can be allowed to automatically propagate throughout the network. Requests from phones 50c with a lower trust level indicator can be held for examination by the operators of the network, or simply discarded. At this point it will be apparent to those skilled in the art that methods and means for requesting updates to CP database 100c are not particularly limited. For example, in place of sending an updated local copy of CP database 100c, which is treated as a request for update, a user of cell-phone 50c can simply forward a number to server 104c by pressing a key such as the pound ("#") key while receiving a phone call. These, and other such methods of sending requests for updates from cell-phone 50c to server 104c are within the scope of the invention.

By having a method for examining suggested updates, system 30c is provided with, amongst other things, a mechanism against to reduce abuse of the communication policy abuse. For example, without such a mechanism, to unblock phone numbers at a network, a spam operator could acquire a cell-phone operated at that network. By deleting the blocked numbers from the copy of the communications policy associated with the acquired phone, communication from those numbers would, once again, become permissible throughout the entire network. By associating trust level indicators with phones 50c, such abuse can be reduced. For example, depending on the level of trust placed on phone 50c from which the update is received, an update from a phone 50c can be treated as an alert to the administrator of server 104c, notifying the administrator that the update should be reviewed to determine whether it merits being distributed propagated to the rest of the network as a change to CP database 100c. Alternatively, the trust level indicator associated with a phone 50c may cause an update request received from that phone to be treated as a 'vote' to update the request, but such a vote would not be determinative of whether an actual change to database 100c is effected in accordance with that vote. Accordingly, central CP database 100c can be updated, for example, when a predetermined number of votes is received from a predetermined number of phones 50c.

Table V shows an example TP database 120c maintained on server 104c.

TABLE V

Example TP Database 120c

| Field 1<br>OID | Field 2<br>Trust Level Indicator |
| --- | --- |
| 647 000-0001 | 90% |
| 647 000-0002 | 30% |
| 647 000-0003 | 10% |

Describing Table V in greater detail, Field 1 contains the unique OID associated with a cell-phone. In this embodiment, as mentioned above, the OID is the phone number associated with a cell-phone 50c. Field 2 contains the trust level indicator associated with each phone listed in Field 1. In the present embodiment, the trust level indicator takes the form of a percentage, 100% referring to the highest trust and 0% referring to the lowest trust. In other embodiments other trust indicators such as a numerical ordering between 1 to 10 can also be used and the use of such indicators are within the scope of the invention.

As mentioned above, the trust indicators are utilized in generating a modification-procedure, in response to requests from phones 50c, for updating CP database 100c. In this embodiment, it will be assumed that when an update request is received from a phone 50c with a trust level indicator greater than about 80%, the modification procedure is to automatically update the contents of central copy of CP 100c, in accordance with the request. It will be further assumed that any updates received from a phone 50c with a trust level indicator between about of 20% or above, and up to and including and about 80%, then the modification procedure is to generate an alert for subsequent examination. Finally, it will be assumed that any update request received from a phone 50c with a trust level below about 20% will result in a modification procedure that counts classifies the received request as vote for changes specified in that request. Accordingly, referring back to Table V, in this example, any updates received from phone $50c_1$, (which has an OID of 647 000-0001) will be automatically incorporated into the central copy of CP 100c maintained on server 104c. On the other hand, any updates received from cell-phone $50c_2$ (which has an OID of 647 000-0002) will result in an alert for the administrator of server 104c to review the requested changes. Finally, any updates received from cell-phone $50c_3$ (which has an OID of 647 000-0003) will be counted as a vote towards a possible future update.

Another embodiment of the invention includes a method to update a communication policy in accordance with a trust policy. The method in accordance with this embodiment can be based on method 1000 of FIG. 10, except using method 1800 in FIG. 18 to perform step 1050 of method 100. This modified version of method 1000 (ie. using method 1800 as step 1050) can be performed by system 30c. Method 1800 incorporates the use of the trust policy, TP database 120c. In order to illustrate the use of a trust policy in updating a communications policy, the following example performance of method 1800 will focus on the multiple steps shown in FIG. 18. Accordingly, it will be assumed that the performance of steps 1010 through 1040 proceed in a similar manner to the initial exemplary performance of method 1000 described above. Thus, prior to discussing this exemplary performance, it is assumed that all copies of CP database 100c are empty. The empty CP database 100c is shown in Table VI.

TABLE VI

Example CP Database 100c<br>Field 1<br>OID (Empty)

Figure 19:
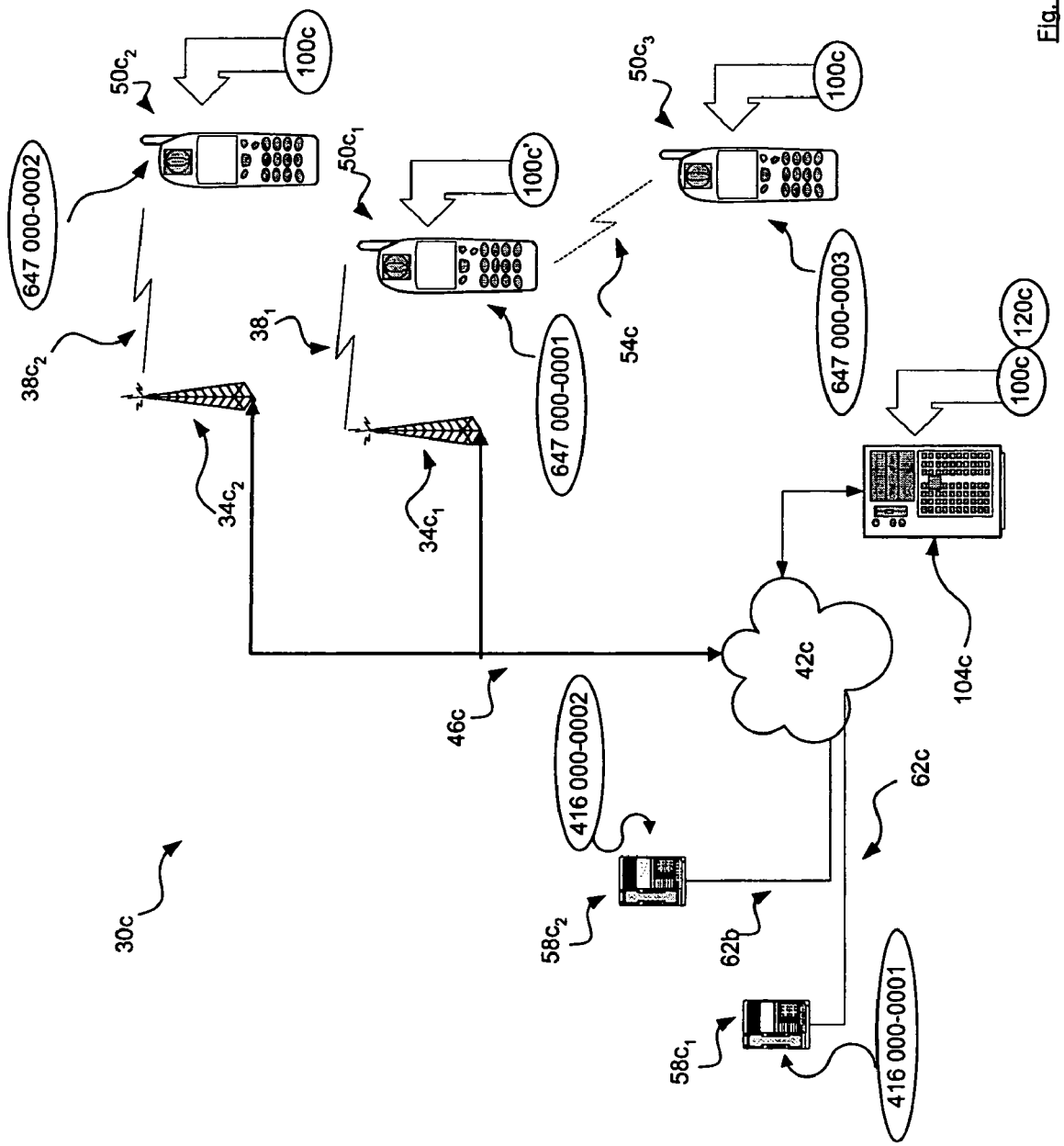
FIG. 19 is a block diagram of a system for managing a communication policy in accordance with another embodiment of the invention.

Referring back to FIG. 10 and proceeding with the current example, beginning at step 1010, a call is received. It is assumed that a call is initiated from phone $58c_1$ which is directed to cell-phone $50c_1$. Next, at step 1020, a request is received to mark the call as impermissible. The request is received from the user operating cell-phone $50c_1$. At step 1030, the common communication policy is accessed. In this example, step 1030 is performed by processor 90 of cell-phone $50c_1$ accessing CP database 100c stored in persistent storage 102 maintained on cell-phone $50c_1$. Next, at step 1040, the local copy of the common policy is updated with the marked identifier. In this example, CP database 100c is first examined to determine whether the marked number of phone $58c_1$, the originator phone is already present in CP database 100c. Having determined that the number is not in CP database 100c, processor 90 of cell-phone $50c_1$ updates the local copy of CP database 100c by inserting the marked number 416 000-0001 such that calls from phone $58c_1$ are now impermissible according to the local copy of CP database 100b. Accordingly, as shown in FIG. 19, the performance of steps 1010 to 1040 using system 30c results in phone $50c_1$ having an updated local copy of CP database 100c indicated at 100c'. This result is in agreement with the initial example performance of method 1000. Table VII shows the contents of CP database 100c'.

TABLE VII

| Example CP Database 100c' |
| --- |
| Field 1 |
| OID |
| 416 000-0001 |

Figure 18:
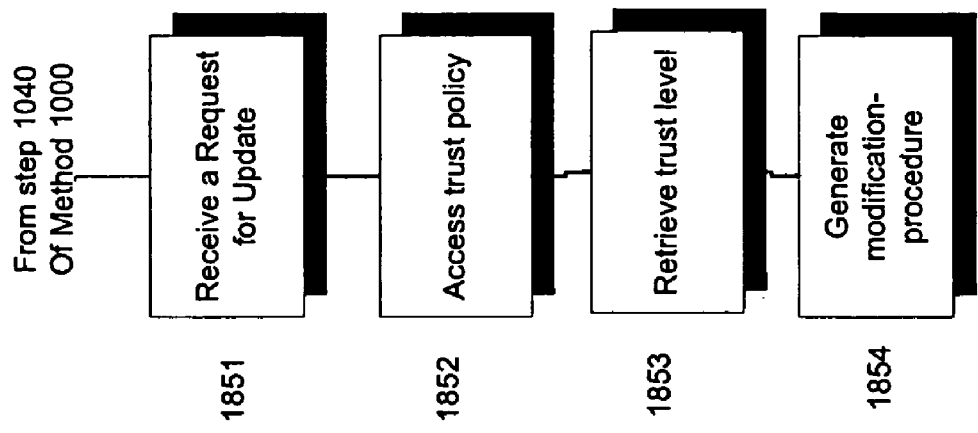
FIG. 18 shows a flow-chart depicting a plurality of steps that can be used to perform one of the steps in the method depicted in FIG. 10.
Figure 20:
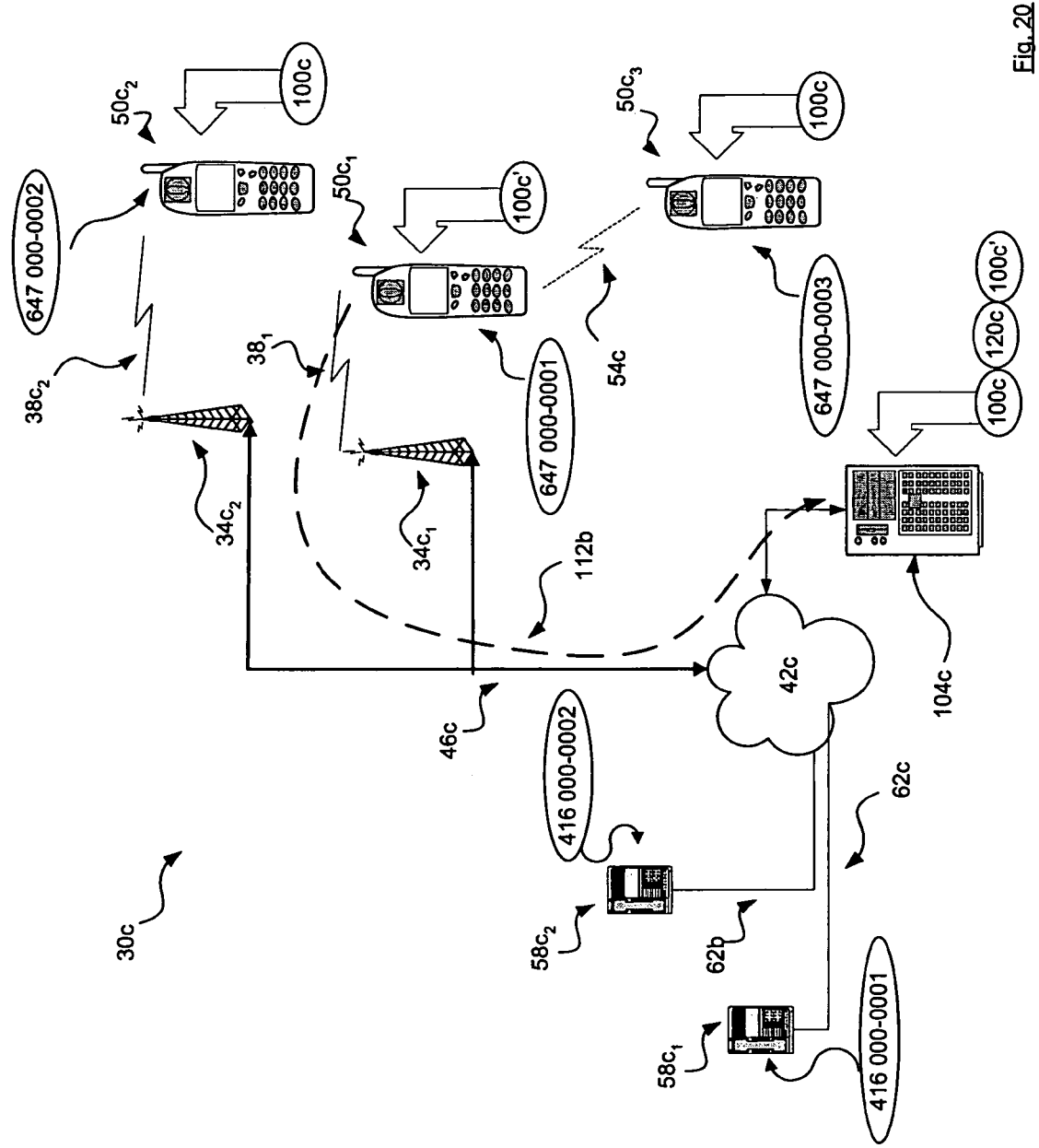
FIG. 20 is a block diagram of a system for managing a communication policy in accordance with another embodiment of the invention.

Referring now to FIG. 18, the example continues with the performance of the steps in method 1800 in order to implement step 1050 of method 1000s. Beginning at step 1851, a request for update is received. In this example, it is assumed that the request is received in the form of an updated CP database 100c. Step 1851 is performed by policy server 104c receiving a copy of CP Database 100c' from cell-phone $50c_1$. Moreover, policy server 104c receives the phone number associated with cell-phone $50c_1$, 647 000-0001. Performance of step 1851 is represented in FIG. 20 as cell-phone $50c_1$ sending a copy of CP Database 100c' to policy server 104c via pathway 112c, such that CP Database 100c' is now stored at policy server 104c.

Figure 21:
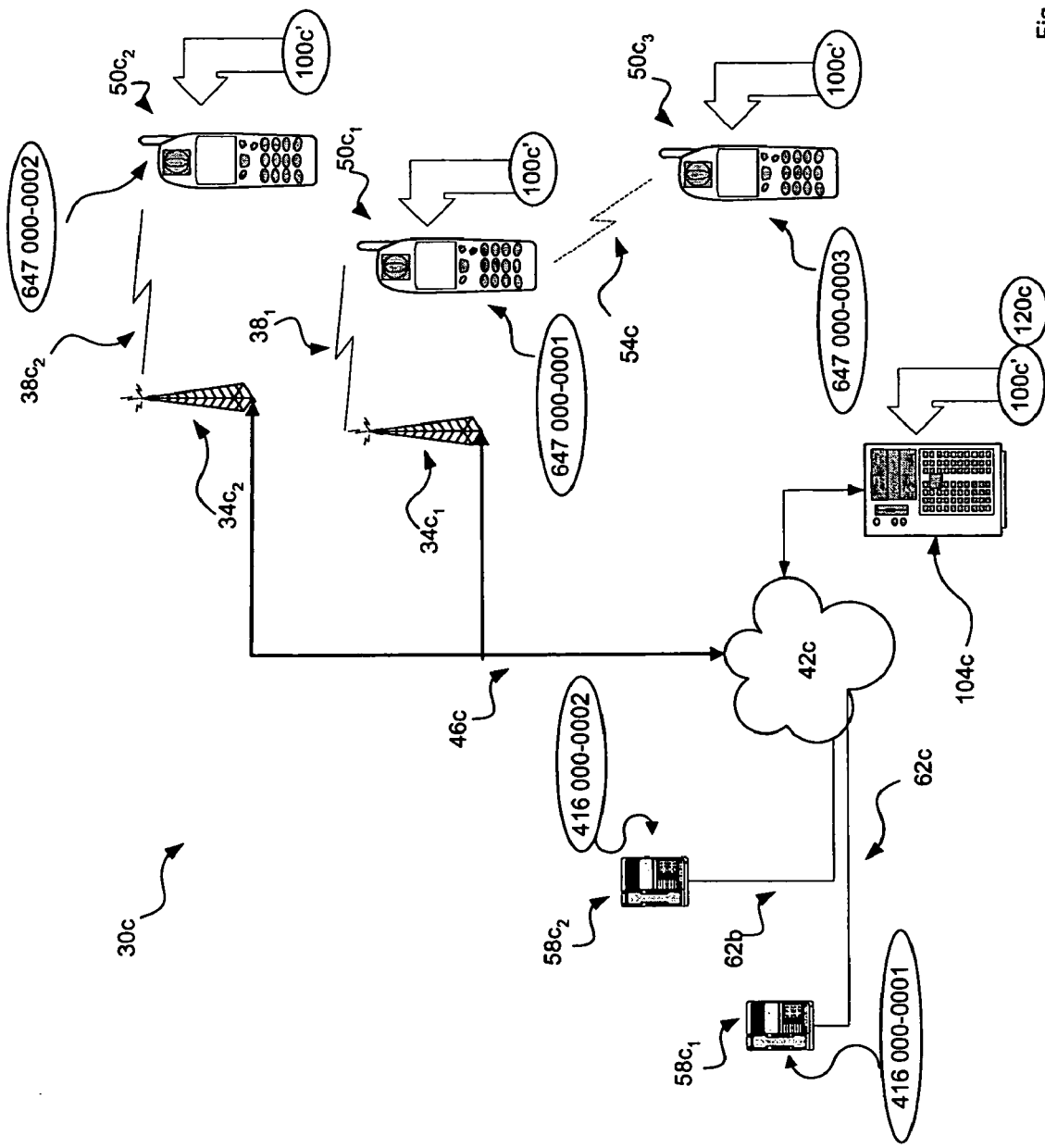
FIG. 21 is a block diagram of a system for managing a communication policy in accordance with another embodiment of the invention.

Next, at step 1852, the trust policy is accessed. In this example, step 1852 is performed by server 104c accessing TP database 120c. Method 1800 then advances from step 1852 to step 1853 where the trust level is retrieved. Specifically, in this example, TP database 100c is examined to determine the trust level associated with phone $50c_1$. To perform this step, TP database 120c is searched to determine whether the phone number of phone $50c_1$ (the phone requesting the change) is present in TP database 120c. In this case, as is shown in Table V, the phone number 647 000-0001 is present in TP database 120c. Moreover, according to TP database 120c, the trust level associated with $50c_1$ is 90%. Accordingly, since the indicator is above 80%, the modification procedure generated is to automatically update the contents of central copy of CP 100c, in accordance with the request. Accordingly, the central copy of the common policy is updated. This step is performed by server 104b by replacing CP Database 100c with the received CP Database 100c'. At this point method 1800 ends. The updated CP Database 100c' at server 104c can now be processed in any desired manner, such as propagating CP Database 100c' to all cell-phones 50c in system 30c. Such a global update, as shown in FIG. 21, can be effected in any desired manner. Having so propagated CP Database 100c' to all cell-phones 50c, now incoming calls from phone $58c_1$ will not be permitted at any of cell-phones 50c.

Figure 22:
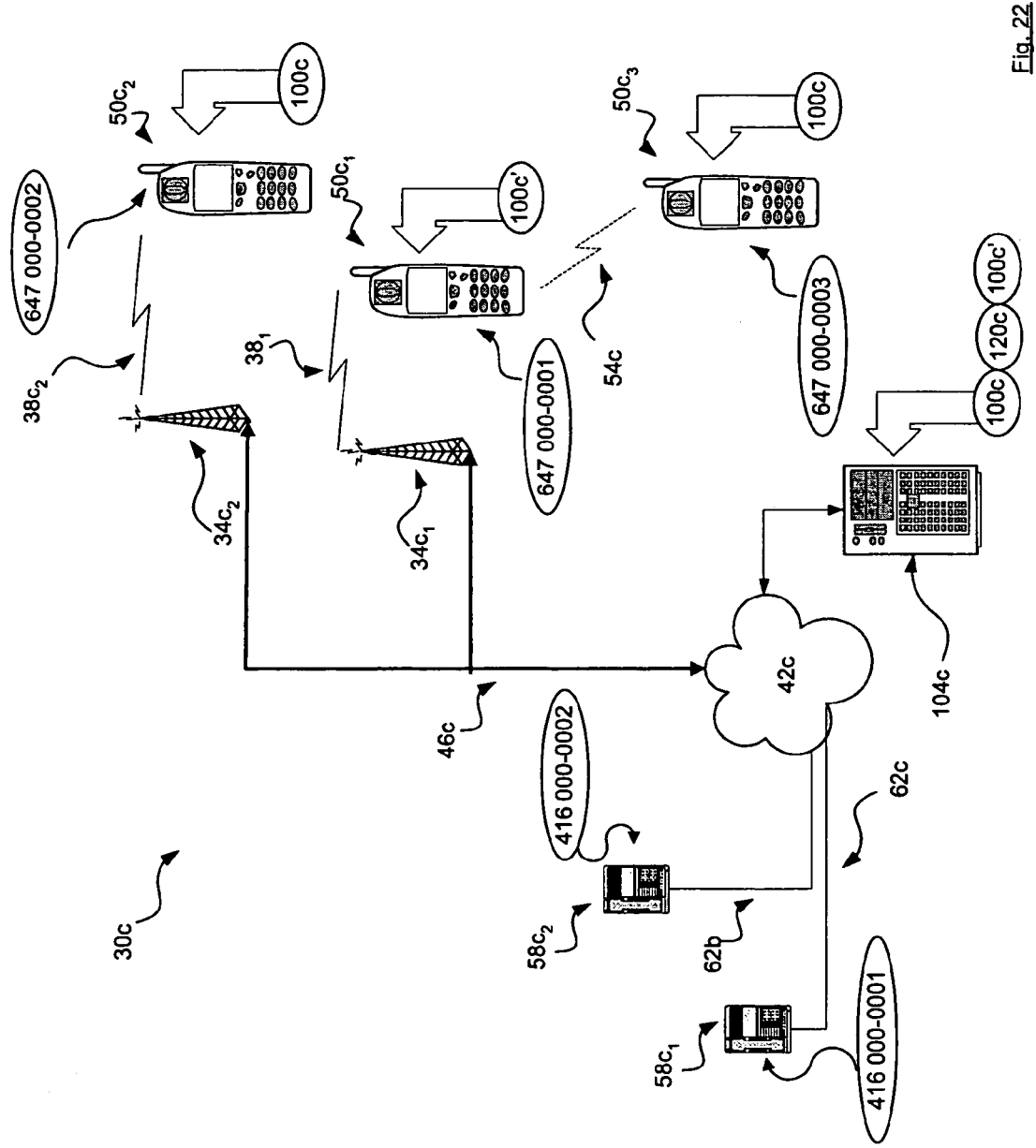
FIG. 22 is a block diagram of a system for managing a communication policy in accordance with another embodiment of the invention.

At this point it will be apparent to those skilled in the art that in other performances of method 1800 with system 30c, the modification-procedure generated at step 1854 will be selected in accordance with the trust level indicator of phone 50c sending the request for update. For example, in this embodiment, if the trust level indicator associated with phone 50c originating the update request is between about 20% and about 80%, then the modification procedure is the generation of an alert for subsequent examination of the request. Thus, in this case, the central copy of the common policy is not updated, but rather, as shown in FIG. 22, the updated local copy is kept on server 104c to be examined at a later time by its operator or system administrator or the like. The operator can subsequently decide that the update merits distributing to the rest of phones 50c on the network and manually effect the changes to CP database 100c so that it reflects the changes in CP database 100c'.

Alternatively, if the trust level indicator associated with the phone originating the update request is below about 20%, the modification-procedure generated at step 1854 is to count the received request as vote for changes specified in that request. The central copy of the common policy is not updated, but rather, the updated local copy is kept on server 104c to be tallied with other similar requests. The change may then be distributed to the rest of the phones on the network if sufficient votes are received in favour of the same changes.

It will now be apparent to those skilled in the art that in different embodiments, different threshold ranges can be used for determining the level of trust necessary for performing one of the above mentioned operations. Furthermore, it will also be apparent that the modification-procedures specified above are not the only possible operations for handling update requests and that in other embodiments, different procedures for dealing with change requests, such as automatically deleting the request, can also be used.

In other embodiments, server 104c can maintain a table associating a range of trust values with a link to a particular operation to be performed, such as a link to a subroutine or a module that is to perform that function. The implementation of the table of operations is not to be limited to any particular manner. The table can be implemented based on variety of data-structures including a database, a linked list, a tree, or as any other suitable data structure.

Referring now to FIG. 23, a method for updating a trust policy is indicated at 2300. Method 2300 is typically implemented on a system such as system 30c that has a policy server such as policy server 104c. Method 2300 relies first on the performance of method 1800 on system 30c, whereby a request for change is received from a phone 50c and managed with in accordance with the trust level indicator associated with that phone 50c. Accordingly, in this example, it will be assumed that prior to the performance of method 1800, CP database 100c is empty as shown in Table VI, that the TP database 120c has the contents shown in Table V, and that the request for change has been placed by phone $50c_1$. Accordingly, at the conclusion of the performance of method 1800, the modification procedure will be selected to automatically update the contents of central copy of CP 100c, in accordance with the request. Thus, it is assumed that CP database 100c' now has the contents shown in Table VII and that the system 30c now has CP database 100c' distributed as shown in FIG. 21.

Referring back to FIG. 23, at step 2310 a determination is made as to whether the communication policy is subject to change. In this embodiment, this determination is based on the potential outcome of the modification procedure generated during the exemplary performance of method 1800.

Since, in the earlier-discussed example, the modification procedure generated was to automatically update CP database 100c, then the determination is that the communication policy is subject to modification.

Next, at step 2320, the trust policy is updated. Specifically, the trust level indicator associated with phone 50c that has originated the update request is updated according to the outcome of the determination made at step 2310. More particularly, in this embodiment, the trust policy is updated according to the following equation if the outcome of the determination is positive (i.e. the communication policy is subject to change):

$$TrustLevelIndicator_{new} = TrustLevelIndicator_{current} \times \frac{n-1}{n} + \frac{1}{n} \quad \text{EQUATION I}$$

Where:

TrustLevelIndicator$_{new}$ is the new trust level indicator, expressed as a percentage, that will be stored in TP Database 120c upon performance of step 2320;

TrustLevelIndicator$_{current}$ is the current trust level indicator, expressed as a percentage, that is currently stored in TP Database 120c prior to the performance of step 2320;

n is an adjustment factor that is any value greater than one.

On the other hand, if the outcome of the determination is negative (i.e. communication policy is not subject to change) the trust policy is updated according to the following equation:

$$TrustLevelIndicator_{new} = TrustLevelIndicator_{current} \times \frac{n-1}{n} \quad \text{EQUATION II}$$

Where:

TrustLevelIndicator$_{new}$ is the new trust level indicator, expressed as a percentage, that will be stored in TP Database 120c upon performance of step 2320;

TrustLevelIndicator$_{current}$ is the current trust level indicator, expressed as a percentage, that is currently stored in TP Database 120c prior to the performance of step 2320;

n is an adjustment factor that is any value greater than one.

(The variables in Equation II have the same meaning as the variables in Equation I.)

Thus, between Equation I and Equation II, it is possible for a trust level indication to have any value between zero and one-hundred-percent, and to be adjusted according to one of those Equations.

Continuing with the previous example, assume that n equals eight. Also recall that in the previous example, the outcome, as determined at step 2310 is positive. Thus, Equation I is applicable to the performance of step 2320. Assuming n equals eight, and recalling that the current Trust Level Indicator for phone 50c was 90%, then, Accordingly, the trust level indicator associated with phone 50c$_1$ is updated according to Equation I, as shown in Equation III.

$$TrustLevelIndicator_{new} = TrustLevelIndicator_{current} \times \quad \text{EQUATION III}$$

$$\frac{8-1}{n} + \frac{1}{8}$$

-continued $$= 90\% \times \frac{7}{100} + \frac{1}{8}$$

$$= 91.25\%$$

Accordingly, the value 91.25% will now be stored in association with phone 50c$_1$ in TP Database 120c. At this point method 2300 ends.

It will now be apparent to those skilled in the art that in other performances of method 2300, the trust indicator associated with phone 50c can result in modification procedure that either alerts the operator to the update request, or counts the update request as a vote. Under these circumstances, it is not possible to determine, immediately upon the receipt of the request by server 104c, whether the communication policy is subject to change. Accordingly, the performance of step 2310 can wait for a predetermined period of time before actually modifying the trust policy stored in TP Database 120c, in accordance with the modification procedure. For example, if the modification procedure is to generate an alert, step 2310 can also generate an alert to the operator of server 104c that method 2300 should pause pending the determination by the operator as to whether to update the communication policy in accordance with the alert. Once the operator has made this determination, then method 2300 can be resumed. If the operator decided to update the communication policy according to the request, then step 2320 can be performed as to increase the trust indicator associated with the requestor; but if the operator decided NOT to update the communication policy according the request, then step 2320 can be performed so as to decrease the trust indicator.

Similarly, if the modification procedure is to simply count the request as a vote, then method 2300 can be paused until a sufficient time period has passed in which to assess whether a threshold number of votes have been received. If sufficient votes are received then the communication policy can be updated accordingly, and likewise, method 2300 can be resumed to perform step 2320 and thereby decide to increase the trust indicator associated with the requestor. Conversely, if a sufficient votes are NOT received to justify modification of the communication policy, then method 2300 can be resumed to perform step 2320 and thereby decrease the trust indicator associated with the requestor.

In still other embodiments of method 2300, trust policy can be updated using different operations. For example, server 104c can maintain two counters, one for the number of requests performed by a particular phone 50c (request counter), and another for the number of such requests that successfully lead to (or can lead to) modification of central CP database 100 (success counter). In this embodiment, trust level indicator associated with a phone 50c is the percentage ratio of the success counter to the request counter. Accordingly, during the performance of step 2320, the two counters would be updated by increasing the request counter by one, and either increasing the success counter by one, if the determination at step 2310 is positive, or leaving it unchanged, if the determination is negative. The trust level indicator associated with that phone would be updated accordingly.

It should now be understood that system 30, 30a, 30b and 30c can be effected in various different manners according to security considerations. For example, while not required, it can be desired to maintain TP database 120c in a separate server (i.e. other than server 104c) from CP database 100c, so that that TP database 120c is kept secure, while CP database 100c remains open and accessible to phones 50c. Alternatively, server 104*c* can be implemented in a distributed manner, across a number of other servers and computing devices, and as such the term server need not be construed in a limiting sense.

While only specific combinations of the various features and components of the present invention have been discussed herein, it will be apparent to those of skill in the art that subsets of the disclosed features and components and/or alternative combinations of these features and components can be utilized, as desired. For example, although GSM and AMPS are wireless communication protocols that are contemplated, it should now be apparent that other wireless communication methods such as the Code Division Multiple Access ("CDMA") for digital connections and the Total Access Communication System ("TACS") for analog connections are all within the scope of the invention. Other protocols include General Packet Radio Service ("GPRS"), and Orthogonal Frequency Division Multiplexing ("OFDM"), amongst others. In another variation, wired network of subscriber devices such as PSTN can also be used.

In a further variation, yet other communication methods such as Ethernet and Voice over Internet Protocol (VoIP) could also be used. Moreover, identifiers other than phone numbers and serial numbers can also be used. For example, when employing Ethernet communications, the Internet Protocol (IP) address assigned to each device can be used as an identifier. Alternatively Media Access Control (MAC) address of each device could also be used. In yet other variations, policies could be applied to a group of devices by using an identifier that represents that group of devices. For example, when using IP addresses as identifiers, only the first 24 bits of an IP address could be used to identify 256 devices at a time, applying policies to all of those devices at once through the use of a single identifier.

In another variation it is possible to maintain CP database 100 of system 30 at base stations 34 rather than at cell-phones 50. For example, a cell-phone 50 can be operable to access CP database 100 in system 30 by communicating with a base station 34.

In yet another variation, each cell-phone 50 could maintain a copy of CP database 100, and update its copy when in range of a base station 34. According to this variation, a cell-phone 50's copy of CP database 100 could be updated using different methodologies. For example, the transfer of CP database 100 could be made selectively, transferring the database only when a difference is found between CP database 100 maintained on the base station and the copy maintained on a cell-phone 50. It should now be apparent that a variety of different methods could be employed for determining a difference. For example, each field of CP database 100 can be compared to the equivalent field of the copy maintained on an individual cell-phone 50 to determine whether there are any differences. Alternatively, sizes of the database files or the date of modification of these files could be compared. Moreover, the comparison can be done either by the base station 34, cell-phone 50 or some other computer trusted with maintaining synchronized copies of CP database 100 between the base stations and the roaming devices. All these methods, and other methods for determining whether a CP database should be transferred to cell-phone 50 are within the scope of this invention.

In another variation, CP database 100 can be updated through a peer-to-peer connection between cell-phones 50. It should now be apparent that this peer-to-peer connection can take the form of a wired connection such as a Universal Serial Bus ("USB") connection, a cross-linked peer-to-peer Ethernet connection, or a wireless connection such as a Bluetooth connection, an infrared (IR) connection, or a peer-to-peer IEEE 801.11b/g connection. In yet another variation, database 122 could be updated through a Local Area Connection ("LAN") to which both cell-phone 50 and at least one base station 34 are connected.

In other variations, the policy can be stored in forms other than a database such as a lookup table. Moreover, the policy can be stored at a computer other than one at base station 34. For example, the policy can be stored on routers and other dedicated computing devices. Also, the policy could be stored on a computer or other electronic device which is operated by an entity other than the office that operates the mobile devices.

In yet another variation, information from other sources besides incoming phone calls can be used for updating CP policy database 100. For example, phone numbers of unwanted callers can be identified from public sources such as web sites, and entered into CP database 100 manually. Moreover, the selection of which numbers to enter into CP database 100 can be done by either users of cell-phones 50, operators of base stations 34, some other third party operator entrusted with maintaining CP database 100, or some combination thereof. Furthermore, any entries into CP database 100 made by the user of a cell-phone 50 may be subject to further verification prior to becoming available to all cell-phones 50.

Another variation of the invention could employ different types of subscriber devices in place of cell-phones. It should now be apparent that these subscriber devices can take the form of enhanced personal digital assistants such as those manufactured by Research In Motion Limited of Waterloo, Ontario, Canada, and PalmOne, Inc. of Milpitas, Calif. USA. In yet another variation policies could be used for other communication types besides voice calls, such as text messaging.

While portions of the foregoing description may individually reference systems 30 and 30*a*, it should now be apparent that all or parts of each of these systems can be combined as appropriate or otherwise desired. Accordingly, those of skill in the art will recognize that when certain references are made to one of these systems, and/or its components, such teachings can also be applicable to other ones of those systems.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A method of processing communications in a voice telephony network having a plurality of subscriber devices and a server; said method comprising the steps of:

maintaining, at said server, a central common communication policy comprising at least one identifier representing whether reception of a first voice call having said at least one identifier is permissible at said subscriber devices in said network;

maintaining, at each said subscriber device, a local common communication policy; said local common communication policy corresponding to said central common communication policy;

maintaining, at each said subscriber device, a local override policy for determining whether to permit said first voice call regardless of contents of said local common communication policy;

receiving a second voice call at one of said subscriber devices; said second voice call having an originator identifier;

receiving a user-input at said one of said subscriber devices representing a marker of said originator identifier;

accessing said local common communication policy at said one of said subscriber devices;

updating said local common communication policy with said originator identifier associated with said marker, such that reception of a third voice call having said originator identifier is impermissible at said one of said subscriber devices; and sending a request for an update to said server whereby to update said central common communication policy with said originator identifier associated with said marker, and sending updates to said plurality of subscriber devices such that reception of a fourth voice call having said originator identifier is impermissible at said plurality of said subscriber devices, unless said local override policy in said at least another one of said subscriber devices indicates that reception of said fourth voice call having said originator identifier is permissible regardless of said central common communication policy.

2. The method of claim 1 wherein said sending updates comprises the step of:

propagating said central common communication policy to said plurality of subscriber devices such that said local common communication policy at each said plurality of subscriber devices is synchronized with said central common communication policy.

3. The method of claim 2 wherein said propagating step is performed after said step of updating said central common communication policy.

4. The method of claim 2 wherein said propagating step is performed once over a given time period.

5. The method of claim 2 wherein said propagating step is performed after said steps of claim 1 are performed a predetermined number of times.

6. The method of claim 1 wherein said user-input is received prior to said second voice call being answered.

7. The method of claim 1 wherein said user-input is received after said second voice call is answered.

8. The method of claim 1 wherein said originator identifier is a Caller-ID string.

9. The method of claim 1 wherein said identifier in said central common communication policy comprises a Caller-ID string.

10. A computer-readable medium storing a plurality of programming instructions; said programming instructions implementing a method of processing communications in a voice telephony network having a plurality of subscriber devices and a server; said method comprising the steps of:

maintaining, at said server, a central common communication policy comprising at least one identifier representing whether reception of a first voice call having said at least one identifier is permissible at said subscriber devices in said network;

maintaining, at each said subscriber device, a local common communication policy; said local common communication policy corresponding to said central common communication policy;

maintaining, at each said subscriber device, a local override policy for determining whether to permit said first voice call regardless of contents of said local common communication policy;

receiving a second voice call at one of said subscriber devices; said second voice call having an originator identifier;

receiving a user-input at said one of said subscriber devices representing a marker of said originator identifier;

accessing said local common communication policy at said one of said subscriber devices;

updating said local common communication policy with said originator identifier associated with said marker, such that reception of a third voice call having said originator identifier is impermissible at said one of said subscriber devices; and sending a request for an update to said server whereby to update said central common communication policy with said originator identifier associated with said marker, and sending updates to said plurality of subscriber devices such that reception of a fourth voice call having said originator identifier is impermissible at said plurality of said subscriber devices, unless said local override policy in said at least another one of said subscriber devices indicates that reception of said fourth voice call having said originator identifier is permissible regardless of said central common communication policy.

11. A subscriber device of a voice telephony network comprising:

a persistent storage device for maintaining, at said subscriber device, a local common communication policy; said local common communication policy corresponding to a central common communication policy maintained b a server; and for maintaining, at the said subscriber device, a local override policy for determining whether to permit a first voice call regardless of contents of said local common communication policy;

a radio device for receiving a second voice call at said subscriber device; said second voice call having an originator identifier;

an input device for receiving a user-input at said subscriber device representing a marker of said originator identifier;

a processor coupled to said persistent storage device and said radio device for accessing said local common communication policy at said subscriber device;

said processor being configured to update said local common communication policy with said originator identifier associated with said marker, such that reception of a third voice call having said originator identifier is impermissible at said subscriber device;

said processor further being configured to send an update request to said server whereby to update said central common policy at said server with said originator identifier associated with said marker, such that reception of a fourth voice call having said originator identifier is impermissible at a plurality of subscriber devices associated with the server unless said local override policy in said at least another one of said subscriber devices indicates that reception of said fourth voice call having said originator identifier is permissible regardless of said central common communication policy; and said processor further configurable to receive updates from said server whereby to synchronise the local common communication policy at the subscriber device with the central common communication policy at said server.

12. A communications system comprising at least one subscriber device according to claim 11 and at least one policy server.

13. A communications system as in claim 12, in which the policy server comprises:

a network interface for communicating with a plurality of subscriber devices via a voice telephony network interconnecting said devices and said interface;

at least one persistent storage device for maintaining a central common communication policy comprising at least one identifier representing whether reception of a first voice call having said at least one identifier is permissible at said subscriber devices in said network;

a processor interconnecting said interface and said at least one persistent storage device; said processor for receiving a local common communication policy maintained at one of said plurality of subscriber devices; said local common communication policy corresponding to said central common communication policy; said local common communication policy updated at said one of said plurality of subscriber devices to comprise an originator identifier such that reception of a second voice call having said originator identifier is impermissible at said one of said plurality of subscriber devices; and said processor operable to update said central common communication policy with said originator identifier, such that reception of a third voice call having said originator identifier is impermissible at said plurality of said subscriber devices.

* * * * *